US012020419B2

(12) United States Patent
Mianzo et al.

(10) Patent No.: US 12,020,419 B2
(45) Date of Patent: Jun. 25, 2024

(54) GROUND ENGAGING TOOL WEAR AND LOSS DETECTION SYSTEM AND METHOD

(71) Applicant: Caterpillar Inc., Peoria, IL (US)

(72) Inventors: Lawrence A Mianzo, Pittsburgh, PA (US); Tod A Oblak, Pittsburgh, PA (US); John M Plouzek, Peoria, IL (US); Raymond Alan Wise, Metamora, IL (US); Shawn Nainan Mathew, Savoy, IL (US); Daniel Paul Adler, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 380 days.

(21) Appl. No.: 17/399,433

(22) Filed: Aug. 11, 2021

(65) Prior Publication Data

US 2023/0053154 A1 Feb. 16, 2023

(51) Int. Cl.
*G06T 7/00* (2017.01)
*G06T 7/12* (2017.01)
*G06T 7/174* (2017.01)
*G06T 7/593* (2017.01)
(Continued)

(52) U.S. Cl.
CPC .............. *G06T 7/001* (2013.01); *G06T 7/12* (2017.01); *G06T 7/174* (2017.01); *G06T 7/593* (2017.01); *G06T 7/60* (2013.01); *G06V 10/25* (2022.01); *G06T 2207/10012* (2013.01);
(Continued)

(58) Field of Classification Search
CPC ........... G06T 7/001; G06T 7/12; G06T 7/174; G06T 7/593; G06T 7/60; G06T 2207/10012; G06T 2207/10028; G06T 2207/20081; G06T 2207/30164;
(Continued)

(56) References Cited

U.S. PATENT DOCUMENTS

| 8,411,930 B2 | 4/2013 | Ridley et al. |
| 9,670,649 B2 | 6/2017 | Bewley et al. |
| 9,886,754 B2 | 2/2018 | Lim et al. |

(Continued)

FOREIGN PATENT DOCUMENTS

| CN | 106592679 A | 4/2017 |
| CN | 107862675 A | 3/2018 |

(Continued)

OTHER PUBLICATIONS

Luis E. Gurrieri et al: "Stereoscopic cameras for the real-time acquisition of panoramic 3D images and videos", Proceedings of SPIE, vol. 8648, Mar. 12, 2013 (Mar. 12, 2013), pp. 1-17, XP055479312, US DOI: 10.1117/12.2002129 ISBN: 978-1-5106-1533-5.

*Primary Examiner* — Chan S Park
*Assistant Examiner* — Daniel C Chang

(57) ABSTRACT

An example wear detection system receives a plurality of images from a plurality of sensors associated with a work machine. Individual sensors of the plurality of sensors have respective fields-of-view different from other sensors of the plurality of sensors. The wear detection system identifies a first region of interest and second region of interest associated with the at least one GET. The wear detection system determines a first set of image points and a second set of images points for the at least one GET based on geometric parameters associated with the GET. The wear detection system determines a wear level or loss for the at least one GET based on the GET measurement.

20 Claims, 12 Drawing Sheets

(51) Int. Cl.
*G06T 7/60* (2017.01)
*G06V 10/25* (2022.01)

(52) U.S. Cl.
CPC ............ *G06T 2207/10028* (2013.01); *G06T 2207/20081* (2013.01); *G06T 2207/30164* (2013.01)

(58) Field of Classification Search
CPC ......... G06V 10/25; G01S 17/86; G01S 17/89; E02F 9/2883
See application file for complete search history.

(56) References Cited

U.S. PATENT DOCUMENTS

| | | | |
|---|---|---|---|
| 10,249,060 B2 | 4/2019 | Wagner et al. | |
| 10,339,667 B2 | 7/2019 | Tafazoli Bilandi et al. | |
| 10,504,072 B2 | 12/2019 | Restum et al. | |
| 10,929,820 B2 | 2/2021 | Restum et al. | |
| 2015/0085123 A1* | 3/2015 | Tafazoli Bilandi | G01S 17/06 348/148 |
| 2016/0237640 A1* | 8/2016 | Carpenter | E02F 9/267 |
| 2017/0051474 A1 | 2/2017 | Finch et al. | |
| 2017/0103506 A1 | 4/2017 | Dandibhotla et al. | |
| 2017/0287124 A1* | 10/2017 | Lim | G06T 7/74 |
| 2017/0352199 A1 | 12/2017 | Finley et al. | |
| 2018/0106019 A1 | 4/2018 | Bewley et al. | |
| 2020/0242804 A1 | 7/2020 | Eisenmann et al. | |
| 2020/0362539 A1 | 11/2020 | Plouzek et al. | |
| 2020/0363203 A1 | 11/2020 | Plouzek et al. | |
| 2020/0393303 A1 | 12/2020 | Betournay et al. | |
| 2021/0042907 A1 | 2/2021 | Campomanes et al. | |
| 2021/0192294 A1* | 6/2021 | Stanhope | G06F 18/2178 |
| 2022/0307234 A1* | 9/2022 | Hillier | G06V 10/143 |

FOREIGN PATENT DOCUMENTS

| | | |
|---|---|---|
| JP | 2019086712 | 6/2019 |
| WO | WO20190227194 A1 | 12/2019 |
| WO | 2020123413 | 6/2020 |
| WO | WO20200237324 A1 | 12/2020 |
| WO | WO20210041988 A1 | 3/2021 |

* cited by examiner

GROUND ENGAGING TOOL WEAR AND LOSS DETECTION SYSTEM AND METHOD

TECHNICAL FIELD

The present disclosure relates to a system and method for detecting wear of objects over time, and more particularly, to a system and method for detecting wear in, or loss of, one or more ground engaging tools (GET) over time using imaging techniques.

BACKGROUND

Machines may be used to perform variety of tasks at a worksite. For example, machines may be used to excavate, move, shape, contour, and/or remove material present at the worksite, such as gravel, concrete, asphalt, soil, and/or other materials. These machines can include a bucket used to collect such materials, and the bucket can include a set of GET, such as teeth, to loosen the material. GET can also include shrouds attached to the bucket between teeth to protect the edge of the bucket. Over time, the GET wear and diminish in size reducing their effectiveness making it more difficult for the bucket to collect worksite material. GET can also break from the bucket. When a GET break goes undetected, the GET can mix with the worksite material and can cause damage to downstream processing equipment such as crushers or pulverizers. Work machines may utilize wear detection systems to identify worn or broken GET before damage to downstream equipment occurs.

An attempt to provide a wear detection system is described in WIPO Pub. No. WO2020237324A1 ("the '324 Publication"), published Dec. 2, 2020. The '324 Publication describes a system having one or more sensors mounted on working equipment, directed toward a GET to monitor status of the GET. The system receives data from the one or more sensors and generates a three-dimensional (3D) representation of at least a portion of the GET and compares the currently generated 3D representation of the GET with a previously generated 3D representation of the GET. The system uses the comparison to determine wear or loss of the GET.

However, sole reliance on 3D representations for detecting GET wear or loss, as described in the '324 Publication, has disadvantages. 3D representations of GET can be overly dense and processing them can consume considerable computing resources. In environments with many sensors, requiring multiple scans of GET during the dig-dump cycle of the work machine, or where speed of GET wear detection is critical, processing 3D representations is not feasible due to computational complexity. As a result, the system described in the '324 Publication may not be suitable for some environments. The systems and methods described herein are directed to addressing one or more of these concerns.

SUMMARY

According to a first aspect, a GET wear detection method includes receiving a plurality of images from a plurality of sensors associated with a work machine, the plurality of images comprising images of at least one ground engaging tool (GET) of the work machine, wherein individual sensors of the plurality of sensors have respective fields-of-view different from other sensors of the plurality of sensors. The method also includes identifying a first region of interest associated with the at least one GET and included in a first image of the plurality of images, the first region of interest including first data characterizing the at least one GET. The method further includes identifying a second region of interest associated with the at least one GET and included in a second image of the plurality of images, the second region of interest including second data characterizing the at least one GET. The method determines a first set of image points for the at least one GET, the first set of image points being determined based at least in part on geometric parameters associated with the at least one GET and first edges of the at least one GET detected in the first data. The method also determines a second set of image points for the at least one GET, the second set of image points being determined based at least in part on the geometric parameters associated with the at least one GET and second edges of the at least one GET detected in the second data. The method also includes determining a GET measurement for the at least one GET based at least in part on the first set of image points and the second set of image points, and determining a wear level or loss for the at least one GET based on the GET measurement.

According to a further aspect, a GET wear detection system includes one or more processors and a plurality of sensors associated with a work machine. The plurality of sensors have differing fields-of-view directed to capture a plurality of images of at least one GET of the work machine. The GET wear detection system also includes a non-transitory computer readable media storing executable instructions that when executed by the one or more processors cause the one or more processors to perform operations including identifying a first region of interest associated with the at least one GET and included in a first image of the plurality of images, the first region of interest including first data characterizing the at least one GET. The operations also include identifying a second region of interest associated with the at least one GET and included in a second image of the plurality of images, the second region of interest including second data characterizing the at least one GET. The operations further include determining a first set of image points for the at least one GET, the first set of image points being determined based at least in part on geometric parameters associated with the at least one GET and first edges of the at least one GET detected in the first data. The operations further include determining a second set of image points for the at least one GET, the second set of image points being determined based at least in part on the geometric parameters associated with the at least one GET and second edges of the at least one GET detected in the second data. The operations further include determining a GET measurement for the at least one GET based at least in part on the first set of image points and the second set of image points, and determining a wear level or loss for the at least one GET based on the GET measurement.

According to another aspect, a work machine includes a bucket comprising at least one GET, a stereoscopic camera comprising a left image sensor and a right image sensor, an infrared sensor, one or more processors, and non-transitory computer readable media storing executable instructions that when executed by the one or more processors cause the one or more processors to perform operations. The operations include receiving a left image of the at least one GET captured by the left image sensor, receiving a right image of the at least one GET captured by the right image sensor, and generating a disparity map based on the left image and the right image. The operations further include identifying a first region of interest associated with the at least one GET based on the disparity map. The operations also include receiving infrared image data from the infrared sensor and identifying a second region of interest associated with the at least one GET within the infrared image data. The operations determine a first set of image points for the at least one GET, the first set of image points based at least in part on geometric parameters associated with the at least one GET and first edges of the at least one GET detected in the disparity map and determine a second set of image points for the at least one GET, the second set of image points determined based at least in part on the geometric parameters associated with the at least one GET and second edges of the at least one GET detected in the second data. The operations further determine a GET measurement for the at least one GET based at least in part on the first set of image points and the second set of image points and determine a wear level or loss for the at least one GET based on the GET measurement.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

The present disclosure is generally directed to systems and methods for detecting wear of components of a work machine in an environment, such as a worksite, using one or more sensors. The one or more sensors can include imaging sensors (that could be part of a stereoscopic camera or "stereo camera"), LiDAR sensors, infrared (IR) sensors, sonar sensors, temperature sensors, or radar sensors capable of capturing imaging data associated with the components. The imaging data can include, but is not limited to, video, images, LiDAR imaging data, IR imaging data, sound-based imaging data, or radar data. The imaging data is analyzed by a wear detection computer system associated with the work machine—aspects of which may be disposed on the work machine, within the stereo camera, within the one or more sensors of the work machine, or external to these or external to the work machine—to detect wear of the component. The component can be one or more GET of a bucket of the work machine, as one example. The one or more sensors of the work machine may each have differing fields-of-view and may produce slightly different imaging data for the component. The differing fields-of-view can reduce errors related to poor lighting conditions, shadows, or debris that could negatively affect imaging of the components. The wear detection system can determine image points which may relate to marker points on GET such as edges, corners, or visual indicators on the components—from captured imaging data and use the image points to determine measurements of the components. Based on the determined measurements, and/or historical or baseline measurements, the wear detection system can determine a wear level or loss of the component. The wear detection system may receive imaging data from the one or more sensors at various time instances in the dig-dump cycle of the work machine, and may determine whether to generate an alert or capture additional imaging data based on the placement of the time instance within the dig-dump cycle.

Figure 1:
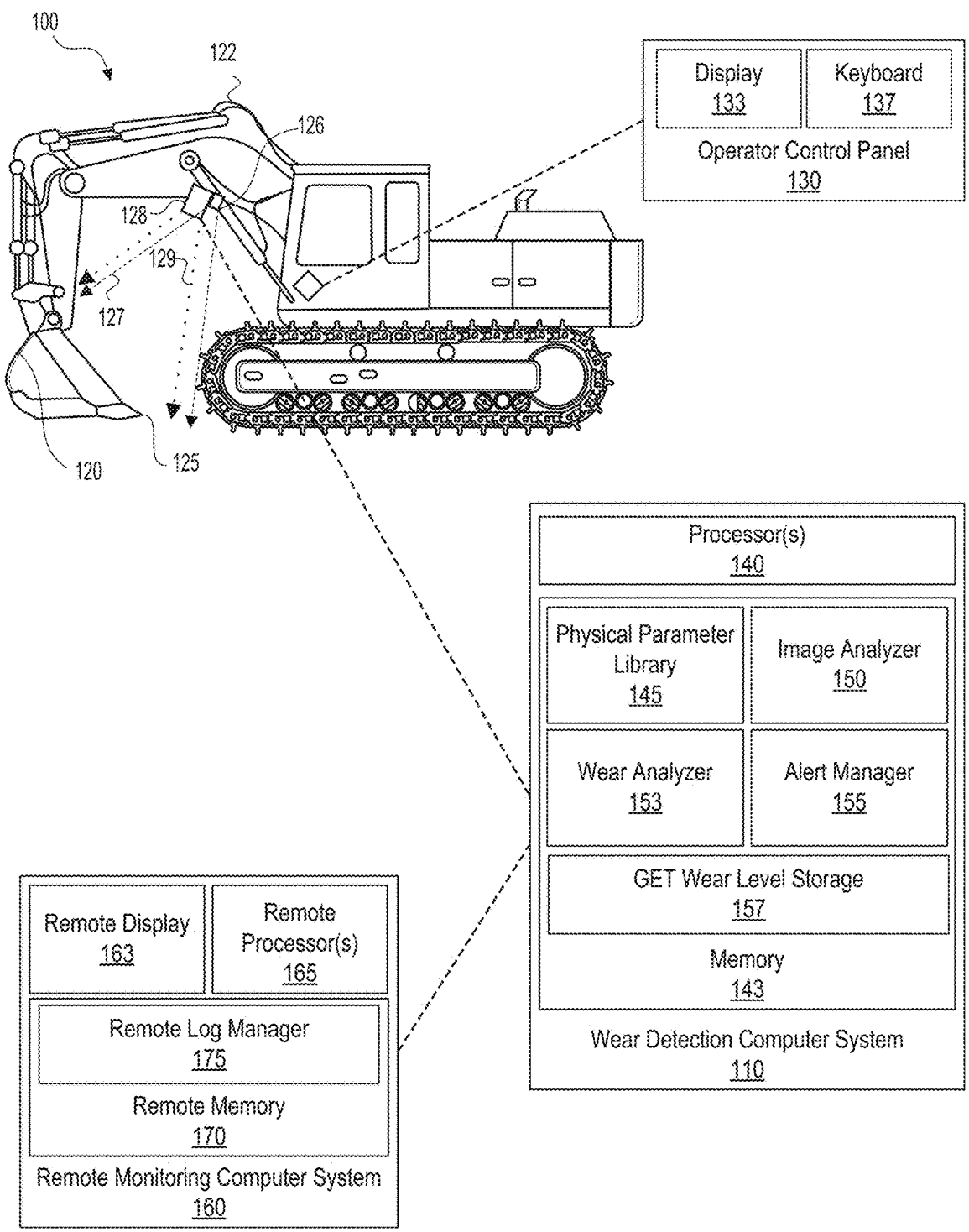
FIG. 1 is a block diagram depicting a schematic view of an example machine including an example system for detecting wear in GET.

FIG. 1 is a block diagram depicting a schematic of an example work machine 100 including an example wear detection computer system 110. While FIG. 1 depicts work machine 100 as a hydraulic mining shovel, in other examples, work machine 100 can include any machine that moves, sculpts, digs, or removes material such as soil, rock, or minerals. As shown in FIG. 1, work machine 100 can include a bucket 120 attached to arm 122. Bucket 120 can include one or more ground engaging tools (GET) 125, such as teeth, that assist work machine 100 in loosening material. While the examples provided in this disclosure typically refer to GET 125 as teeth, other types of GET are contemplated to be within the scope of the embodiments provided by this disclosure. For example, GET can include lip shrouds, edge guards, adapters, ripper protectors, cutting edges, sidebar protectors, tips, or any other tool associated with a work machine that wear over time due to friction with worksite material.

Work machine 100 also includes one or more sensors having respective fields of view such as sensor 126 having field-of-view 127 and stereo camera 128 having field-of-view 129. Both field-of-view 127 and field-of-view 129 are directed to bucket 120 and GET 125. As shown in FIG. 1, field-of-view 127 and field-of-view 129 overlap but differ. Sensor 126 can include image sensors, LiDAR sensors, IR sensors, sonar sensors, or radar sensors as just some examples.

As used in the in the present disclosure, the term "imaging data" refers to data produced by sensor 126 or stereo camera 128 and received by wear detection computer system 110 that can be interpreted or processed to reflect the size, shape, or appearance of GET 125. While the present disclosure refers to sensor 126 in the singular, in some embodiments, work machine 100 will typically include more than one sensor 126 in addition to stereo camera 128, each with their own respective field-of-view 127. For example, work machine 100 may include camera 128 having field-of-view 129, a LiDAR sensor, an additional imaging sensor, and an IR sensor, all of which may produce imaging data processed by wear detection computer system according to disclosed embodiments.

In some embodiments, sensor 126 comprises an adaptive scanning LiDAR sensor, i.e., a LiDAR sensor for which its resolution and field of view can be commanded, controlled, and configured. For example, sensor 126 can include an AEYE 4Sight M™. In some embodiments, field-of-view 127 starts with a baseline of 60 degrees by 30 degrees (representing a "low" resolution range scan) which can then be adjusted by 0.1 degrees to high definition region of interest spanning 0.025 degrees, but other fields of view and angular resolutions may be present in other embodiments. Sensor 126 can be configured to collect as many as 1,600 points per square degree at a frequency of 100 Hz. The precision of sensor 126 is a function of the angular resolution of field-of-view 127 and the distance between sensor 126 and GET 125. As an example, when GET 125 is approximately six meters from sensor 126 and field-of-view 127 is configured as 60 degrees by 30 degrees, a 1,600 points-per-square degree scan would yield LiDAR hits within an captured rectangle of approximately 7.2 meters by 3.2 meters. By refocusing the field of view, a LiDAR hit can register 2.6 millimeters in the horizontal and vertical directions. While the above describes one example sensor 126, different LiDAR sensors capable of adaptive scanning can be used in various embodiments.

Sensor 126 can also include an infrared sensor or a sensor capable of detecting a heat signature of GET 125. For example, sensor 126 can include a long-wave, FLIR® infrared camera with a 640×512 resolution, 9 Hz refresh rate, and a 75-degree field of view. An infrared sensor 126 can complement camera 128 in environments where there is low light or where debris may stick to GET 125 during operation. Other examples of sensor 126 can include sonar or radar sensors.

Stereo camera 128 includes a left image sensor and a right image sensor that are spaced apart as to capture a stereo image of objects within field-of-view 129, such as bucket 120 and GET 125. In some embodiments, the left image sensor and the right image sensor capture monochromatic images. Stereo camera 128 can also include a color image sensor to capture color images of objects within field-of-view 129. In some embodiments, camera 128 outputs digital images or work machine 100 may include an analog to digital converter disposed between camera 128 and wear detection computer system 110 to covert analog images to digital images before they are received by wear detection computer system 110. While the present disclosure refers to stereo camera 128 having a single field-of-view 129 for ease of discussion, those having skill in the art will understand that each image sensor (e.g., left, right, color) of camera 128 has its own respective field-of-view to generate stereoscopic images from which GET 125 can be measured according to disclosed embodiments.

The one or more sensors of work machine 100, such as sensor 126 and camera 128, can include a lens cleaning device to remove debris, fog, or other obstructions from the surface (or screen) of the lenses of the one or more sensors in some embodiments. The lens cleaning device can include, for example, a nozzle for emitting compressed air, washer solvent, or washer antifreeze solvent. The lens cleaning device can also include a moving wiper that is configured to contact and wipe the surface of the lens to push debris or other obstructions away from the lens surface. In some embodiments, the cover of the lenses of the one or more sensors may include an actuator that rotates the lens screen (for cylindrical lens screens) or slides the lens screen (for flat lens screens) so that it contacts one or more wipers to remove debris from the screen.

As work machine 100 operates within a worksite, it may move arm 122 to position bucket 120 to move or dig material within the worksite as part of a dig-dump cycle. As work machine 100 positions bucket 120 through the dig-dump cycle, bucket 120 may move in and out of field-of-view 127 and field-of-view 129. Sensor 126 and camera 128 may be positioned so that they have an unobstructed view of GET 125 during the dig-dump cycle. For example, sensor 126 and camera 128 may be positioned on work machine 100 so that bucket 120 and GET 125 are visible at the moment bucket 120 empties material within the dig-dump cycle. As another example, sensor 126 and camera 128 may be positioned so that bucket 120 enters their fields-of-view when arm 122 is fully extended or fully contracted within the dig-dump cycle. As explained below with respect to FIGS. 2-4, the position of sensor 126 and camera 128 (and accordingly field-of-view 127 and field-of-view 129) may vary depending on the type of work machine 100 and specifics related to its worksite.

In some embodiments, field-of-view 127 and field-of-view 129 may capture image data of bucket 120 and GET 125 at different points in the dig-dump cycle. For example, sensor 126 may capture image data of GET 125 at an early part of the dig-dump cycle (e.g., closer to the start of the cycle than the end of the cycle), and camera 128 may capture image data of GET 125 in a late part of the dig-dump cycle (e.g., closer to the end of the cycle than the start of the cycle). In some embodiments, sensor 126 and/or camera 128 may adjust their respective fields-of-view 127, 129 to collect image data of GET 125 at different points in the dig-dump cycle. For example, in some embodiments, both sensor 126 and camera 128 may capture image data of GET 125 at an early part of the dig-dump cycle, then adjust fields-of-view 127, 129 to capture image date of GET 125 in a late part of the dig-dump cycle.

According to some embodiments, work machine 100 includes an operator control panel 130. Operator control panel 130 can include a display 133 which produces output for an operator of work machine 100 so that the operator can receive status or alarms related to wear detection computer system 110. Display 133 can include a liquid crystal display (LCD), a light emitting diode display (LED), cathode ray tube (CRT) display, or other type of display known in the art. In some examples, display 133 includes audio output such as speakers or ports for headphones or peripheral speakers. Display 133 can also include audio input devices such as microphone or ports for peripheral microphones. Display 133 includes a touch-sensitive display screen in some embodiments, which also acts as an input device.

Display 133 can display information about the wear level or loss of GET 125 that has been rendered by wear computer detection system 110. For example, display 133 may display calculated measurements of GET 125. The calculated measurements may be color coded in some embodiments to reflect a health status of GET 125. For example, the calculated measurements may be displayed with a green background if GET 125 is considered to have an acceptable wear level, yellow background if GET 125 are close to needing replacement, or red if GET 125 have broken or worn to the point of needing replacement. Display 133 can also show an image of bucket 120, GET 125, or an image of a region of interest within fields-of-view 127, 129 related to GET 125 rendered by wear computer detection system 110.

In some embodiments, operator control panel 130 also includes a keyboard 137. Keyboard 137 provides input capability to wear detection computer system 110. Keyboard 137 includes a plurality of keys allowing the operator of work machine 100 to provide input to wear detection computer system 110. For example, an operator may depress the keys of keyboard 137 to select or enter the type of work machine 100, bucket 120, and/or GET 125 according to examples of the present disclosure. Keyboard 137 can be non-virtual (e.g., containing physically depressible keys) or keyboard 137 can be a virtual keyboard shown on a touch-sensitive embodiment of display 133.

As shown in FIG. 1, wear detection computer system 110 includes a one or more processors 140. Processor(s) 140 can include one or more of a central processing unit (CPU), a graphics processing unit (GPU), a field-programmable gate array (FPGA), some combination of CPU, GPU, or FPGA, or any other type of processing unit. Processor(s) 140 may have numerous arithmetic logic units (ALUs) that perform arithmetic and logical operations, as well as one or more control units (CUs) that extract instructions and stored content from processor cache memory, and then executes the instructions by calling on the ALUs, as necessary, during program execution. Processor(s) 140 may also be responsible for executing drivers and other computer-executable instructions for applications, routines, or processes stored in memory 143, which can be associated with common types of volatile (RAM) and/or nonvolatile (ROM) memory.

Wear detection computer system 110 also includes a memory 143. Memory 143 can include system memory, which may be volatile (such as RAM), non-volatile (such as ROM, flash memory, etc.) or some combination of the two. Memory 143 can further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by wear detection computer system 110.

Memory 143 stores data, including computer-executable instructions, for wear detection computer system 110 as described herein. For example, memory 143 can store one or more components of wear detection computer system 110 such as a physical parameter library 145, an image analyzer 150, a wear analyzer 153, an alert manager 155, and GET wear level storage 157. Memory 143 can also store additional components, modules, or other code executable by processor(s) 140 to enable operation of wear detection computer system 110. For example, memory 143 can include code related to input/output functions, software drivers, operating systems, or other components.

According to some embodiments, aspects of wear detection computer system 110 may be disposed within camera 128. For example, camera 128 may include one or more of processor(s) 140 and/or memory 143. Similarly, aspects of wear detection computer system 110 may be disposed within sensor 126. In addition, or alternatively, aspects of wear detection computer system 110 may be disposed on work machine 100 and outside of sensor 126 or camera 128.

Physical parameter library 145 includes physical parameter sets related to work machine 100, bucket 120, GET 125, sensor 126 and/or camera 128. For example, physical parameter library 145 can include measurement data related to the size of bucket 120, shape of bucket 120, size of GET 125, shape of GET 125, and the spatial relationship between GET 125 and bucket 120, and/or the spatial relationship between sensor 126 and camera 128, as just some examples. Physical parameter library 145 can also include parameters related to the size and shape of GET 125 in a new or unworn state and parameters related to the size and shape of GET 125 when they have reached maximum wear.

Physical parameter library 145, in some embodiments, may include geometric parameters related to marker points of bucket 120 or GET 125. The marker points are related to aspects or reference points of bucket 120 and GET 125 that can be used by wear analyzer 153 to measure wear or loss of GET 125. For example, the marker points can include corners of GET 125, the edge of bucket 120 where GET 125 engage with bucket 120, the corner between an edge of bucket 120 and GET 125, or physical markers applied to GET 125 such as welds, paint, grooves, reflective tape, or bar codes. Physical parameter library 145 may include physical parameter sets having information about the relative location of the marker points to GET 125 or bucket 120. For example, the physical parameter sets can include angles of the corners of GET 125, the relative location of physical markers on GET 125 to the edge of GET 125 or the edge of bucket 120. Embodiments of wear detection computer system 110 may include physical parameter sets beyond the specific examples described here, and a person of ordinary skill in the art would understand that other methods of detecting the marker points on bucket 120 or GET 125 can be used and that physical parameter library 145 may include physical parameters sets that can be used by wear analyzer 153 to identify the marker points in image data collected by sensor 126 and/or camera 128.

Physical parameter library 145 can also include templates or reference images related to the combination of bucket 120 and GET 125 (e.g., a bucket-tool template). For example, for work machine 100, one of the templates stored in physical parameter library 145 can include an image of bucket 120 with GET 125 as bucket 120 is expected to be positioned within field-of-view 127 and/or field-of-view 129. The bucket-tool templates can represent GET 125 that are unworn (e.g., unworn or expected edges) or GET 125 that have reached maximum wear (e.g., a threshold edge). Physical parameter library 145 can also include other information related to the wear of GET 125 to assist wear analyzer 153 in determining when GET have worn to the point of needing replacement. Wear data related to GET 125 can be in the form of actual measurement (e.g., metric or imperial dimensions) or in the form of pixel values, as just some examples.

As another example, physical parameter library 145 can include CAD-based models of GET 125. The CAD-based models can be models of reference GET 125 developed using computer-aided design programs such as AutoCAD®, Autodesk®, SolidWorks®, or other well-known CAD program. The CAD-based models can be used by wear detection computer system 110 as reference points to compare observed GET 125 sizes and shapes to a model, standard, or unworn GET of the same type to determine wear or loss of GET 125. In some embodiments, the CAD-based models may include the location, orientation, and/or relative positioning of the points on GET 125.

Physical parameter library 145 can include multiple physical parameter sets where each physical parameter set corresponds to a work machine, bucket, GET, or a combination of these. During operation, an operator may use operator control panel 130 to select a physical parameter set from physical parameter library 145 matching bucket 120 and GET 125, or work machine 100. For example, if the work machine 100 is a hydraulic mining shovel having a model number "6015B," the operator may use operator control panel 130 to input the model number "6015B," and wear detection computer system 110 may load into memory 143 a physical parameter set corresponding to a model 6015B hydraulic mining shovel from physical parameter library 145. In some examples, a list of templates available in physical parameter library 145 can be shown on display 133 upon a power-up or reset operation of wear detection computer system 110, and an operator may select one of the physical parameter sets from the list for operation depending on the model number of work machine 100, bucket type of bucket 120, or type of GET 125.

In some embodiments, the operator may position bucket 120 and GET 125 within field-of-view 129 of camera 128 at the beginning of a work shift and cause wear detection computer system 110 to capture an image of bucket 120 and GET 125 using an input on operator control panel 130. Wear detection computer system 110 may then perform an image matching process to match bucket 120 and GET 125 with a physical parameter set and configure itself for the wear detection and image processing processes disclosed herein based on the matching physical parameter set. In some embodiments, wear detection computer system 110 may use sensor 126 and field-of-view 127 for this configuration process instead of camera 128 and field-of-view 129.

Image analyzer 150 can be configured to analyze imaging data captured by either sensor 126 or camera 128 to identify GET 125 within field-of-view 127 and field-of-view 129 and to measure wear of GET 125 based on processing of that imaging data. For example, image analyzer 150 can receive stereoscopic images from camera 128 in the form of left rectified images (captured by the left image sensor of camera 128) and a right rectified image (captured by the right image sensor of camera 128). Image analyzer 150 may perform various computer vision techniques on the left rectified image and the right rectified image to identify or determine a region of interest corresponding to GET 125. As another example, image analyzer 150 may receive imaging data captured by sensor 126 which can be used to identify a region of interest corresponding to GET 125. In the disclosed embodiments, image analyzer 150 receives data from sensor 126 to determine wear or loss of GET 125, as described in more detail below.

In some embodiments, image analyzer 150 processes two sets of the imaging data when detecting wear or loss of GET 125. The first set of imaging data is captured to identify a region of interest within field-of-view 127 or field-of-view 129. The region of interest corresponds to the relative location of GET 125 within field-of-view 127 or field-of-view 129. The first set of imaging data—for detecting the region of interest—is a broad and lower resolution imaging data capture intended to locate a general region of interest for GET 125 and may be referred to as a "coarse scan." In some embodiments, the first set of imaging data can be captured using camera 128, and image analyzer 150 determines the region of interest using computer vision or machine learning techniques. In other embodiments, the first set of imaging data can be captured using sensor 126 at a first, lower resolution (e.g., 60 degrees by 30 degrees in a LiDAR embodiment of sensor 126) that is relatively wide. In some implementations, image analyzer 150 receives the first set of imaging data from both sensor 126 and camera 128.

When image analyzer 150 identifies a region of interest corresponding to GET 125, it may then control sensor 126 to focus on the specific region of interest to perform a higher-resolution scan, or "fine scan" in some embodiments. For example, image analyzer 150 may communicate with the application programming interface (API) of sensor 126 to command it to change field-of-view 127 to become narrower with a focus on the identified region of interest. Sensor 126 then performs another scan of GET 125 to collect a second set of imaging data. The second set of imaging data—having been captured by sensor 126 with a narrower field-of-view 127—will be of higher resolution than the first imaging data captured by either sensor 126 (when set with a wide field of view) or camera 128.

In some embodiments, the coarse scan can be performed by either sensor 126 or camera 128 and the fine scan can be performed by the other of camera 128 or sensor 126. Alternatively, both sensor 126 and camera 128 may perform both the coarse scan and the fine scan.

In one embodiment, image analyzer 150 creates a dense stereo disparity map based on the left rectified image and the right rectified image received from camera 128. Image analyzer may segment the dense stereo disparity map to identify the region of interest. In addition, image analyzer 150 may also create a three-dimensional point cloud based on the dense stereo disparity map and may segment the three-dimensional point cloud to identify the region of interest.

In addition to computer vision techniques, or as an alternative to using computer vision techniques, image analyzer 150 can also employ deep learning or machine learning techniques to identify regions of interest within left rectified images and/or right rectified images captured by camera 128. For example, image analyzer 150 may use a deep learning GET detection algorithm that employs a neural network that has been trained to identify regions of interest based on a corpus of images where individual GET, groups of GET, or GET and bucket combinations have been labeled. Image analyzer 150 may also use a deep learning GET-location algorithm that employs a neural network that has been trained to locate GET within an image. The GET-location algorithm can be trained using corpus of images where individual GET have been labeled. Once the GET-location algorithm identifies individual GET within an image, it outputs the corresponding location for the GET. For example, the GET-location algorithm can output a pixel location or a bounding box output related to the location of the GET.

In some embodiments, the deep learning GET detection algorithm includes a neural network that has been trained to identify regions of interest based on disparity maps. For example, the corpus of training data for the deep learning GET detection algorithm may include disparity images between a left-rectified and right-rectified image where individual GET, groups of GET, or GET and bucket combinations have been labeled.

As noted above, once image analyzer 150 identifies the region of interest including GET 125, it may command and control sensor 126 to focus field-of-view 127, or command and control camera 128 to focus field-of-view 129 on the region of interest. In some embodiments, image analyzer 150 uses spatial relationship data between sensor 126 and camera 128 to command sensor 126 to alter field-of-view 127 on the region of interest. For example, in LiDAR embodiments, once sensor 126 receives commands to change its field-of-view, it may alter the configuration of its MEMS (micro-electromechanical system) mirrors to narrow field-of-view 127 to capture higher-resolution imaging data related to GET 125.

From the captured higher-resolution imaging data, image analyzer 150 can create a three-dimensional point cloud corresponding to GET 125. Each point in the three-dimensional point cloud corresponds to a "hit" or detection point captured by sensor 126, such as a LiDAR hit or an infrared heat signature. In some embodiments, the real-life distance between the points can be as small as 1 millimeter. In embodiments with sufficiently high resolution (i.e., where the real-life distance between points is less than approximately 2.5 mm), image analyzer 150 communicates the three-dimensional point cloud data to wear analyzer 153 for wear detection analysis. In other embodiments, image analyzer 150 may perform additional processing of the three-dimensional point cloud data to further refine it for wear analysis.

For example, in some embodiments, image analyzer 150 converts the three-dimensional point cloud to a dense mesh surface. Image analyzer 150 may further convert the dense mesh surface to a sparse mesh surface before communicating the GET imaging data to wear analyzer 153. Conversion from a three-dimensional point cloud, to a dense mesh surface, then to a sparse mesh surface may be desirable to reduce computational expenditure when comparing the imaging data captured by sensor 126 to a CAD-based GET model. Conversion from a three-dimensional point cloud, to a dense mesh surface, then to a sparse mesh surface can also filter out noise that may be present in the imaging data due to oversampling.

In some embodiments, wear analyzer 153 fuses the lower-resolution, first-received imaging data from camera 128 with the higher-resolution data, second-received imaging data received from sensor 126 to gain confidence in the observed measurement of GET 125. In such embodiments, image analyzer 150 performs additional processing on the left image and right image captured by camera 128. For example, once image analyzer 150 identifies the regions of interest it can further process them to create a left-edge digital image corresponding to the left rectified image and a right-edge digital image corresponding to the right rectified image. Image analyzer 150 may employ gradient magnitude search-based edge detection, but other edge detection techniques employed within the field of computer vision (e.g., zero-crossing based edge detection techniques) could be employed in other embodiments to create the left-edge digital image and the right-edge digital image.

In some examples, image analyzer 150 may refine edge estimates of GET 125 and/or identify individual GET 125 by using an expected location of GET 125 within the captured image. For example, image analyzer 150 may know the expected position of GET 125 relative to bucket 120 based on the physical parameter set stored in physical parameter library 145 corresponding to the type of bucket 120 and GET 125 in use. Using this information, image analyzer 150 can go to the expected location in selected image and capture a pixel region proximate to the teeth. The pixel region can then be used to further identify the tooth based on computer vision techniques such as application of a convolution filter, segmentation analysis, edge detection, or pixel strength/darkness analysis within the pixel region. In some embodiments, image analyzer 150 may use an individual tooth template to apply to the pixel region to further refine the location of the tooth using computer vision techniques. Image analyzer 150 may further refine edges using dynamic programming techniques. Dynamic programming techniques can include smoothing based on the strength of the edge, whether the edge is close to a hole or region of uncertainty in the dense stereo disparity map, or other edge detection optimization techniques. Image analyzer 150 can also use the output of the GET-location algorithm to gain confidence in the determining the location of the GET and to further refine edge estimates based on the output of the GET-location algorithm.

Image analyzer 150 may also create a sparse stereo disparity that is provided to wear analyzer 153 that wear analyzer 153 can use along with the higher-resolution imaging data captured by sensor 126 to determine wear or loss in GET 125. In some embodiments, image analyzer 150 creates the sparse stereo disparity between the left-edge digital image (associated with the left rectified image) and the right-edge digital image (associated with the right rectified image), and this disparity is used by wear analyzer 153. Alternatively, the sparse stereo disparity may be calculated from a first region of interest image (associated with the left rectified image) and a second region of interest image (associated with the right rectified image) and image analyzer 150 may detect an edge from the sparse stereo disparity image.

Wear analyzer 153 can be configured to analyze the sparse stereo disparity generated by image analyzer 150 for wear. For example, the physical parameter set associated with bucket 120 and GET 125 can include expected data related to unworn GET 125 or a set of unworn GET 125 that has been calibrated based on the expected image capture of camera 128. The expected data can be in the form of pixels, actual measurement, a CAD-based model of GET 125 or an edge image related to unworn GET, as just some examples. Once wear analyzer 153 receives the sparse stereo disparity, it can fuse and correlate that sparse stereo disparity with the three-dimensional point cloud) of the higher-resolution imaging data captured by sensor 126 (or, in some embodiments, the dense mesh surface or sparse mesh surface determined based on the three-dimensional point cloud) to determine measurement data related to the GET 125. It may then compare the determined measurement data to expected data corresponding to an unworn version of GET 125 to determine wear levels, or loss, for GET 125.

In some embodiments, image analyzer 150 identifies marker points in image data collected from sensor 126 and/or camera 128. Marker points, as noted above, can refer to corners of GET 125, edges of bucket 120 that meet GET 125, or can refer to physical or visual markers on bucket 120 or GET 125. For example, when image analyzer 150 is identifying corners of GET 125 as marker points it may perform corner detection techniques known in the field of computer vision such as Moravec, Harris & Stephens, Shi-Tomasi, Forstner, multi-scale Harris, Laplacian of Gaussian, Wang and Brady, SUSAN (smallest univalue segment assimilating nucleus), Trajkovic and Hedley and/or Hessian techniques as just some examples. Other methods of corner detection be used, as well as performing segmentation, pattern matching, or template matching analysis based on image data collected by sensor 126 and/or camera 128 to identify marker points.

In some embodiments, in addition to, or as an alternative to, computer vision techniques, image analyzer 150 may use deep learning or machine learning techniques to identify marker points within regions of interest. For example, image analyzer 150 may deploy a marker point detection algorithm that has been trained using a corpus of data where marker points (e.g., corners, edges, markers) of GET 125 have been labeled. The marker point detection algorithm can be trained using rectified, monochrome images (e.g., similar to imaging data provided by the left-image and right-image sensors of camera 128), color images (e.g., similar to imaging data provided by color image sensor of camera 128), disparity maps (e.g., similar to a disparity generated based on imaging data provided by the left-image and right-image sensors of camera 128), LiDAR point cloud imaging data and/or infrared imaging data, as just some examples. Training data for marker point detection algorithm may vary, and correspond with, the embodiment of sensor 126 and camera 128 deployed in embodiment of work machine 100.

Image analyzer 150 also maps image points in the imaging data across image data sources. For example, image analyzer 150 may determine image points related to the end tips of GET 125 in imaging data captured by sensor 126 and imaging data captured by 128. Image analyzer 150 may do this to determine errors in imaging data that might be caused by debris or poor lighting conditions. For example, image analyzer 150 may disregard image point data from one set of imaging data captured by sensor 126 that appears to be an outlier when compared to image point data of another set of imaging data captured by the imaging data of camera 128, or vice versa. In some embodiments, image analyzer 150 may compare image point data determined from recently captured imaging data to historical image point data and disregard image point data that is inconsistent with the historical image point data.

In some embodiments, pixel counts associated with the sparse stereo disparity can be used to measure the wear or loss of GET. Pixel counts can include area (e.g., total pixel for the GET), height of the GET in pixels, width of the GET in pixels, the sum of height and width of the GET, as just some examples. The manner of determining pixel counts can vary depending on the shape and style of the GET. For example, for GET that are much longer than they are wide, height pixel counts may be used, whereas for GET that are much wider than they are long, width pixel counts may be used. Various methods for determining pixel counts may be used without departing from the spirit and scope of the present disclosure.

In some embodiments, wear analyzer 153 can calculate a similarity score between the determined measurement data and the expected data corresponding to unworn GET 125. The similarity score can reflect a measure of how well the determined measurement data of GET 125 matches the expected data of the physical parameter set. For example, the similarity score can include use of an intersection of union or Jaccard Index method of detecting similarity. In some embodiments, a dice coefficient or F1 Score method of detecting similarity can be employed to determine the similarity score. The similarity score can also include a value reflecting a percentage of how many pixels of the sparse stereo disparity overlap with the expected edge image. In some embodiments, the similarity score may be scaled or normalized from zero to one hundred.

The similarity score can provide an indication of wear of GET 125. For example, a low score (e.g., a range of 0 to 20) may indicate that one of GET 125 has broken or is missing indicating tooth loss. A high score (e.g., a range 80-100) may indicate that a tooth is in good health and needs no replacing. A score in between the low and high scores can provide a wear level for the tooth, with higher scores indicating a longer lead time for tooth replacement than a lower score.

In some embodiments, wear analyzer 153 can collect measurement data related to GET 125 over time and use the collected measurement data to determine a wear level of GET 125 and a wear trend of GET 125. Wear analyzer 153 may store collected measurement data in GET wear level storage 157. For example, work machine 100 can be operating in its worksite over several days for a job. As work machine 100 moves material during the job, camera 128 provides stereo images bucket 120 and GET 125 to wear detection computer system 110, and image analyzer 150 creates sparse stereo disparities for GET 125. Wear analyzer 153 can map measurement data (e.g., pixel counts, metric measurements, imperial measurements) associated with the GET 125 at several instances of time over the period of time of the job. As bucket 120 and GET 125 engage with material at the worksite, it is expected that GET 125 will diminish in size due to wear. Accordingly, the measurement data associated with GET 125 will likewise decrease over time, and the pixel counts over time will reflect a wear trend. Wear analyzer 153 can determine a wear level for GET 125 at a particular point in time using the wear trend at the particular point in time. The wear level for GET 125 may indicate that GET 125 need replacement or it may indicate loss of one or more of GET 125. In some embodiments, measurement data associated with GET 125 can be stored in memory 143 and applied to multiple jobs and multiple worksites, and the wear trend can be applicable to the lifetime of GET 125. In such embodiments, pixel counts associated with GET 125 captured by wear analyzer 153 may be reset when bucket 120 or GET 125 are replaced, and wear analyzer 153 can restart collection of pixel counts for GET 125 from a zero-time point.

Since wear analyzer 153 determines a wear trend based on measurement data for GET 125 measured over time, wear analyzer 153 can also form predictions of when GET 125 may need replacement. For example, if wear analyzer 153 determines that measurement data associated with GET 125 show that GET 125 lose 1% of life per ten work hours (because the measurement data decreases by 1% per ten work hours), and GET 125 have been used for eight hundred work hours, wear analyzer 153 may determine that GET 125 need to be replaced within 200 hours.

In some embodiments, wear detection computer system 110 can include alert manager 155. Alert manager 155 can be in communication with wear analyzer 153 and may monitor the wear trend and wear level determined by wear analyzer 153. Alert manager 155 can provide messaging alerts to operator control panel 130 based on information determined by wear analyzer 153. For example, when the wear level reaches a wear threshold value, alert manager 155 may generate an alert that is shown on display 133 of operator control panel 130. The threshold value can correspond to values indicating extreme GET wear or, in some cases, complete GET loss. The alert may provide an indication to the operator of work machine 100 that one or more GET 125 need replacement. The wear threshold value can vary from embodiments and may dependent on the type of GET 125 and the material at the worksite with which GET 125 engage.

Alert manager 155 can also provide an alert that GET 125 may need replacement at some point in the future, for example, that GET 125 may need to be replaced within two weeks. A replacement alert can include information related to wear trend predictions for GET 125. For example, the replacement alert can include a quantification of the wear trend (e.g., GET 125 wear 2% per workday), the amount of time the teeth have been in use, or the expected date or time GET 125 will reach the wear threshold based on usage data.

In some embodiments, alert manager 155 can monitor the wear trend determined by wear analyzer 153 and provide a wear level value to display 133 to inform operator of work machine 100 of the current wear level. For example, if the wear trend indicates that GET 125 are 60% worn down, based on the wear trend, alert manager 155 may provide an indication that GET 125 have 40% of their life left before they need to be replaced. The display 133 can also inform an operator that a tooth has broken, indicating tooth loss (e.g., when one or more of GET 125 have less than 20% life).

In some embodiments, alert manager 155 can generate instructions that cause wear levels to be rendered on display 133 showing a wear level or measurement of GET 125. For example, if wear analyzer 153 determines, based on processed imaging data, that one of GET 125 is currently 325 mm, alert manager 155 may generate instructions that when executed by processor(s) cause display 133 to show that the one GET is currently measures 325 mm.

Wear detection computer system 110 can be in communication with a remote monitoring computer system 160 in some implementations. Remote monitoring computer system 160 can include a remote display 163, one or more remote processor(s) 165, and a remote memory 170. Remote monitoring computer system 160 can be located at the work site where one or more work machines 100 operate and may be in communication with associated instances of wear detection computer system 110 at the work site. Remote monitoring computer system 160 can be configured to display GET wear levels, and store GET wear information, for multiple work machines 100 to facilitate monitoring of GET health throughout a work site. For example, remote display 163 may be configured to show user interfaces corresponding to the one or more work machines 100 to display respective GET 125 wear levels in one location for ease of monitoring. Remote monitoring computer system 160 may be implemented as a laptop computer, a desktop computer system, or a mobile device.

Remote monitoring computer system 160 includes a one or more remote processors 165. Remote processor(s) 165 can include one or more of a central processing unit (CPU), a graphics processing unit (GPU), a field-programmable gate array (FPGA), some combination of CPU, GPU, or FPGA, or any other type of processing unit. Remote processor(s) 165 may have numerous arithmetic logic units (ALUs) that perform arithmetic and logical operations, as well as one or more control units (CUs) that extract instructions and stored content from processor cache memory, and then executes the instructions by calling on the ALUs, as necessary, during program execution. Remote processor(s) 165 may also be responsible for executing drivers and other computer-executable instructions for applications, routines, or processes stored in remote memory 170, which can be associated with common types of volatile (RAM) and/or nonvolatile (ROM) memory.

Remote monitoring computer system 160 also includes remote memory 170. Remote memory 170 can include system memory, which may be volatile (such as RAM), non-volatile (such as ROM, flash memory, etc.) or some combination of the two. Remote memory 170 can further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by remote monitoring computer system.

Remote memory 170 stores data, including computer-executable instructions, for remote monitoring computer system 160 to command and control remote display 163 and to implement remote log manager 175. Remote memory 170 can also store additional components, modules, or other code executable by remote processor(s) 165 to enable operation of remote monitoring computer system 160. For example, remote memory 170 can include code related to input/output functions, software drivers, operating systems, or other components.

Remote monitoring computer system 160 includes a remote display 163 which produces monitoring output for a manager of a work site that is related to the status of GET health and to receive alerts and alarms related to GET wear levels for one or more work machines 100 at a work site. Remote display 163 can include a liquid crystal display (LCD), a light emitting diode display (LED), cathode ray tube (CRT) display, or other type of display known in the art. In some examples, remote display 163 includes audio output such as speakers or ports for headphones or peripheral speakers. Remote display 133 can also include audio input devices such as microphone or ports for peripheral microphones. Remote display 133 includes a touch-sensitive display screen in some embodiments, which also acts as an input device.

Like display 133 (on work machine 100), remote display 163 of remote monitoring computer system 160 can display information about the wear level or loss of GET 125 that has been rendered by wear computer detection system 110 at a work site. For example, remote display 163 may display calculated measurements of GET 125 for one or more work machines 100. The calculated measurements may be color coded in some embodiments to reflect a health status of GET 125. For example, the calculated measurements may be displayed with a green background if GET 125 is considered to have an acceptable wear level, yellow background if GET 125 are close to needing replacement, or red if GET 125 have broken or worn to the point of needing replacement. Display 133 can also show an image of bucket 120, GET 125, or an image of a region of interest within fields-of-view 127, 129 related to GET 125 rendered by respective wear computer detection systems 110 of work machines 100 at a work site.

Wear detection computer system 110 allows an operator of work machine 100 to be informed when GET 125 need replacement, or has broken, due to extensive wear. The processes employed by wear detection computer system 110—which are described in more detail below—provide for accurate and precise measurement of GET wear at a scale of less than 5 mm allowing an operator to halt operation of work machine 100 in the event of extreme GET wear or loss. The processes and techniques deployed by wear detection computer system 110 can be used with a variety of work machines.

Figure 2:
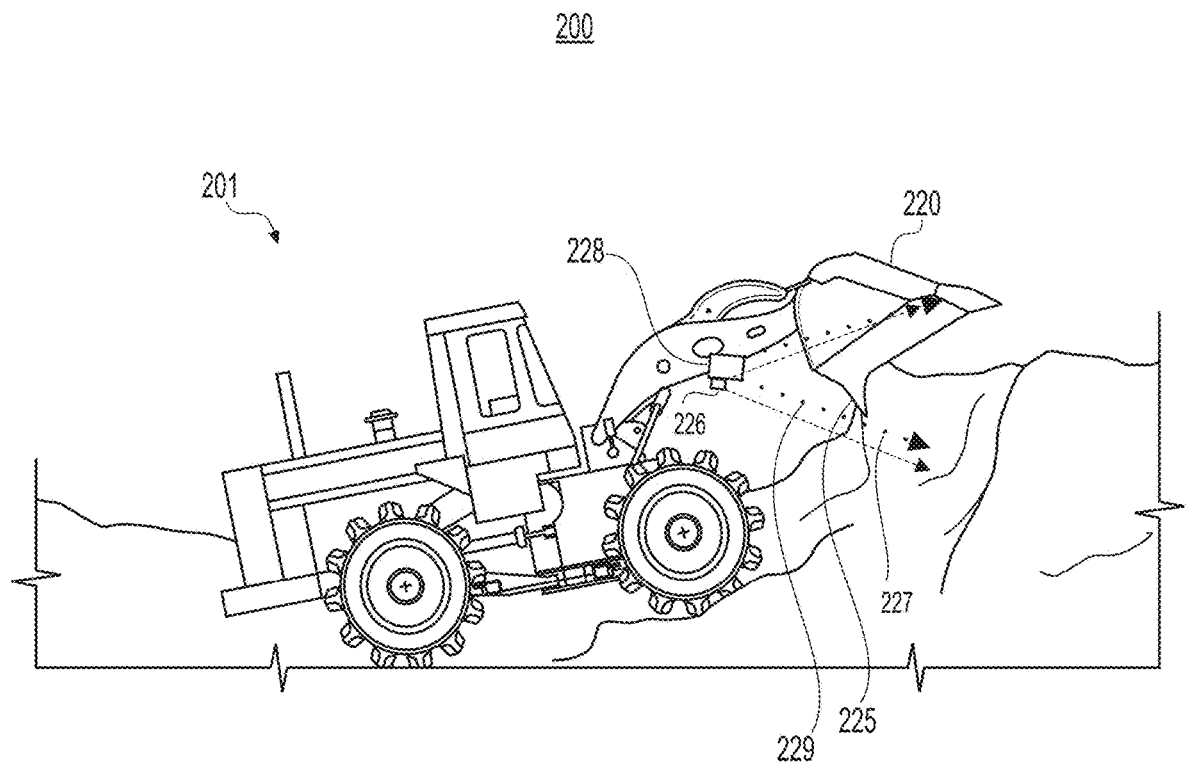
FIG. 2 is a diagram depicting a schematic side view of example environment having an example machine including an example system for detecting wear in GET.

For example, FIG. 2 is a diagram depicting a schematic side view of an example environment 200 in which a wheel loader work machine 201 is operating. Wheel loader work machine 201 can include a bucket 220 and one or more GET 225. As shown in FIG. 2, a sensor 226 and a camera 228 are positioned so that GET 225 and bucket 220 are within a field-of-view 227 (of sensor 226) and field-of-view 229 (of camera 228) during a dump end of the dig-dump cycle. As a result, LiDAR sensor 226 and camera 228 can be configured in such embodiments to capture imaging data when bucket 220 is at rest at the dump end of the dig-dump cycle.

Figure 3:
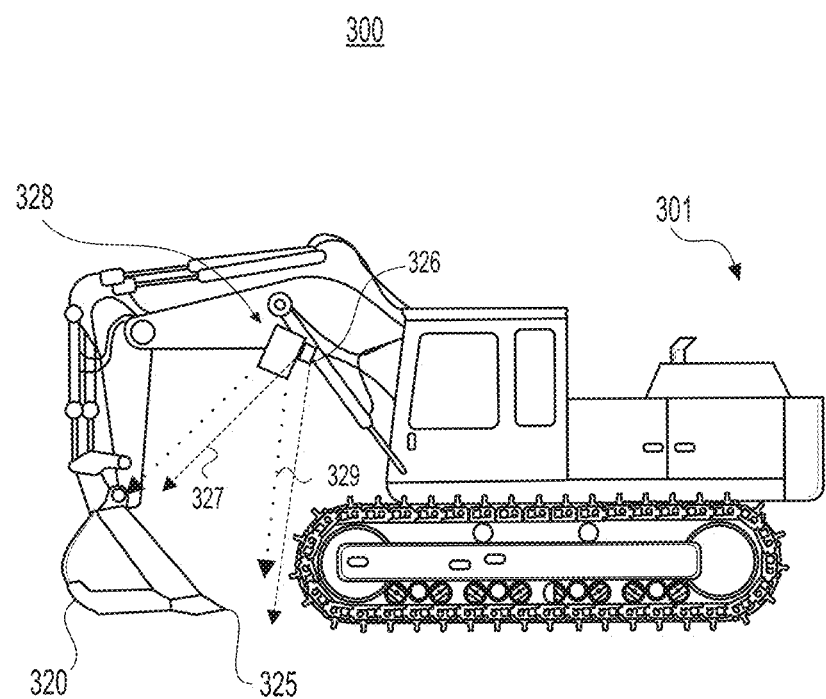
FIG. 3 is a diagram depicting a schematic side view of another example environment having an example machine including an example system for detecting wear in GET.

As another example, FIG. 3 is a diagram depicting a schematic side view of an example environment 300 in which a hydraulic mining shovel work machine 301 is operating. Hydraulic mining shovel work machine 301 can include a bucket 320 and one or more GET 325. In contrast to the positions of sensor 226 and camera 228 for wheel loader work machine 201, a sensor 326 and a camera 328 are positioned such that GET 325 are within a field-of-view 327 (of sensor 326) and field-of-view 329 (of camera 328) during a dig end of the dig-dump cycle. Sensor 326 and camera 328 can be configured in such embodiments to capture imaging data when bucket 320 is at rest at the dig end of the dig-dump cycle.

Figure 4:
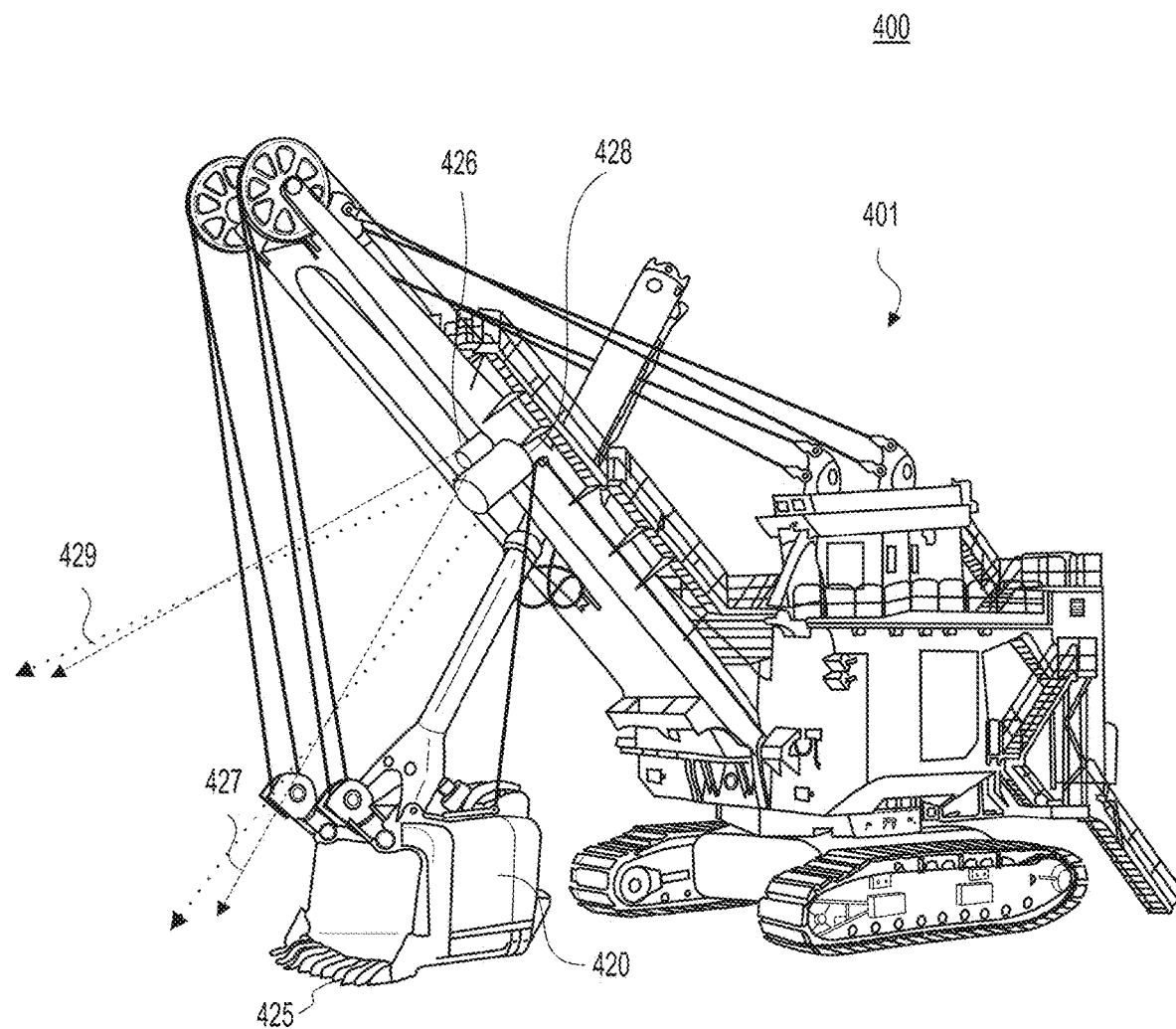
FIG. 4 is a diagram depicting a schematic side view of another example environment having an example machine including an example system for detecting wear in GET

In yet another example, FIG. 4 is a diagram depicting a schematic side view of example an environment 400 in which an electric rope shovel work machine 401 is operating. Electric rope shovel work machine 401 can include a bucket 420, one or more GET 425, a sensor 426 and a camera 428. As shown in FIG. 4, GET 425 may be within a field-of-view 427 (of sensor 426) and field-of-view 429 (of camera 428) at a midpoint in the dig-dump cycle, but when bucket 420 is relatively close to sensor 426 and camera 428. In such embodiments, sensor 426 and camera 428 can be configured to capture imaging data when bucket 420 enters a range of positions correlating to field-of-view 427 and field of view 429.

It should be noted that FIGS. 2-4 are merely examples for particular work machines and sensor/camera locations, but sensors 226, 326, 426 and cameras 228, 328, 428 can be positioned so that their respective fields-of-view 227, 327, 427, 229, 329, 429 capture image data at any point in the dig-dump cycle of work machines 201, 301, 401. Moreover, the described positioning of sensors 226, 326, 426 and cameras 228, 328, 428 can be combined in some embodiments. For example, the present disclosure contemplates embodiments of wheel loader work machine 201, hydraulic mining shovel work machine 301, and electric rope shovel work machine 401 having sensors and cameras with fields-of-view directed to the beginning, middle, and/or end of the dig-dump cycle.

Figure 5:
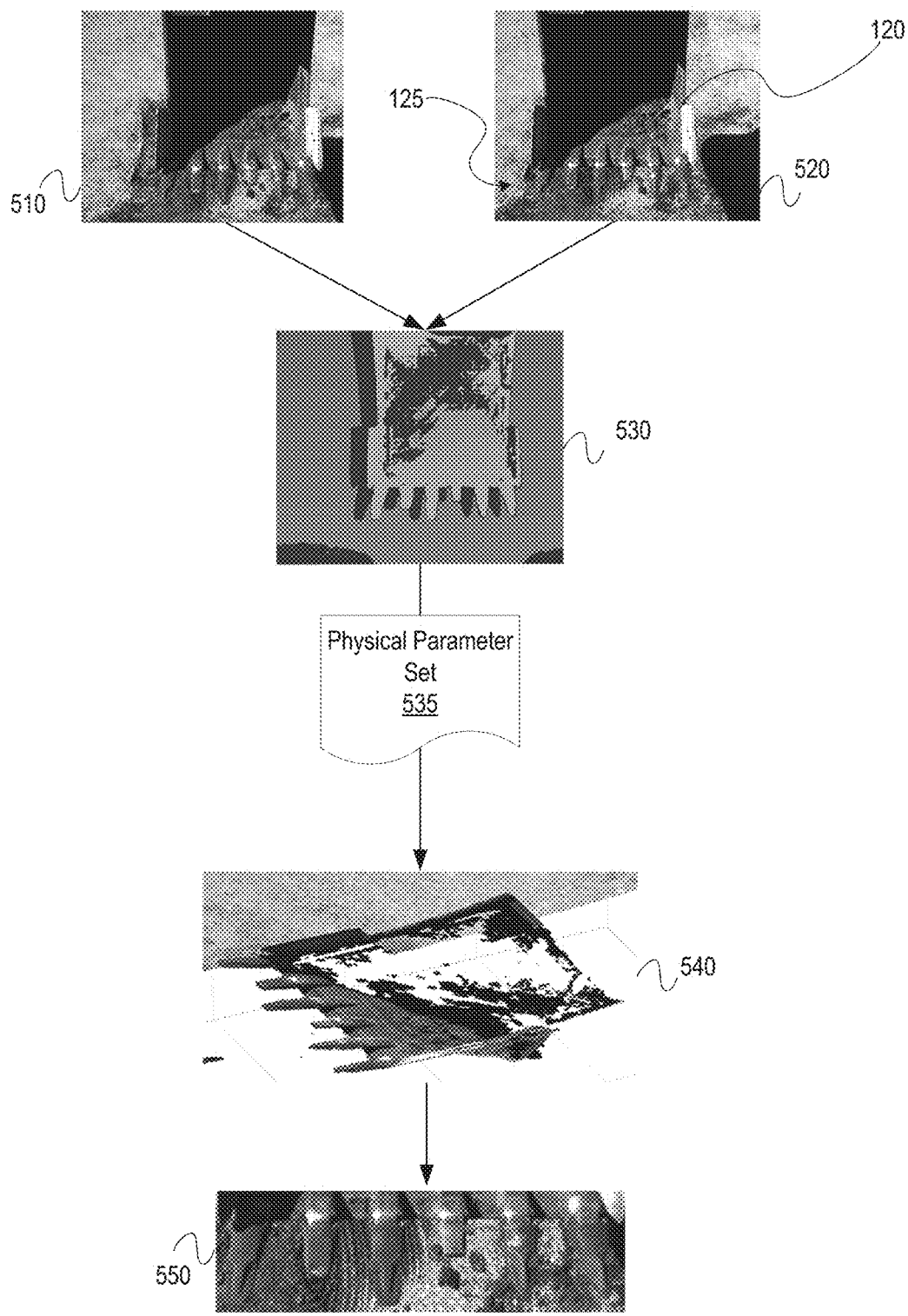
FIG. 5 is an image data flow diagram depicting an example flow of image data for a region of interest detection process using computer vision techniques.

FIG. 5 depicts an image data flow diagram 500 depicting an example flow of imaging data for a region of interest detection process using computer vision techniques. Image data flow diagram 500 includes images that are received, processed, and generated by image analyzer 150 when detecting regions of interest within imaging data captured by camera 128 related to GET 125. Image data flow diagram 500 includes a left image 510 and a right image 520 captured by camera 128. Left image 510 can be a rectified image captured by the left image sensor of camera 128. Right image 520 can be rectified image captured by the right image sensor of camera 128. Both left image 510 and right image 520 include images of bucket 120 and GET 125.

Image analyzer 150 may process left image 510 and right image 520 to create disparity map 530. Disparity map 530 can be a dense stereo disparity map showing the disparity between each pixel of left image 510 and each pixel of right image 520. Using disparity map 530 and a physical parameter set 535, obtained from physical parameter library 145 and associated with bucket 120, GET 125 and/or work machine 100, image analyzer 150 can build a three-dimensional point cloud 540. 3D point cloud 540 shows disparity between left image 510 and right image 520 in three dimensions. Image analyzer 150 may then perform a segmentation analysis on three-dimensional point cloud 540 to identify a region of interest 550 including GET 125 within left image 510, right image 520, or both. In some embodiments, image analyzer 150 may use region of interest 550 to command and control sensor 126 to capture higher-resolution imaging data for GET 125.

Figure 6:
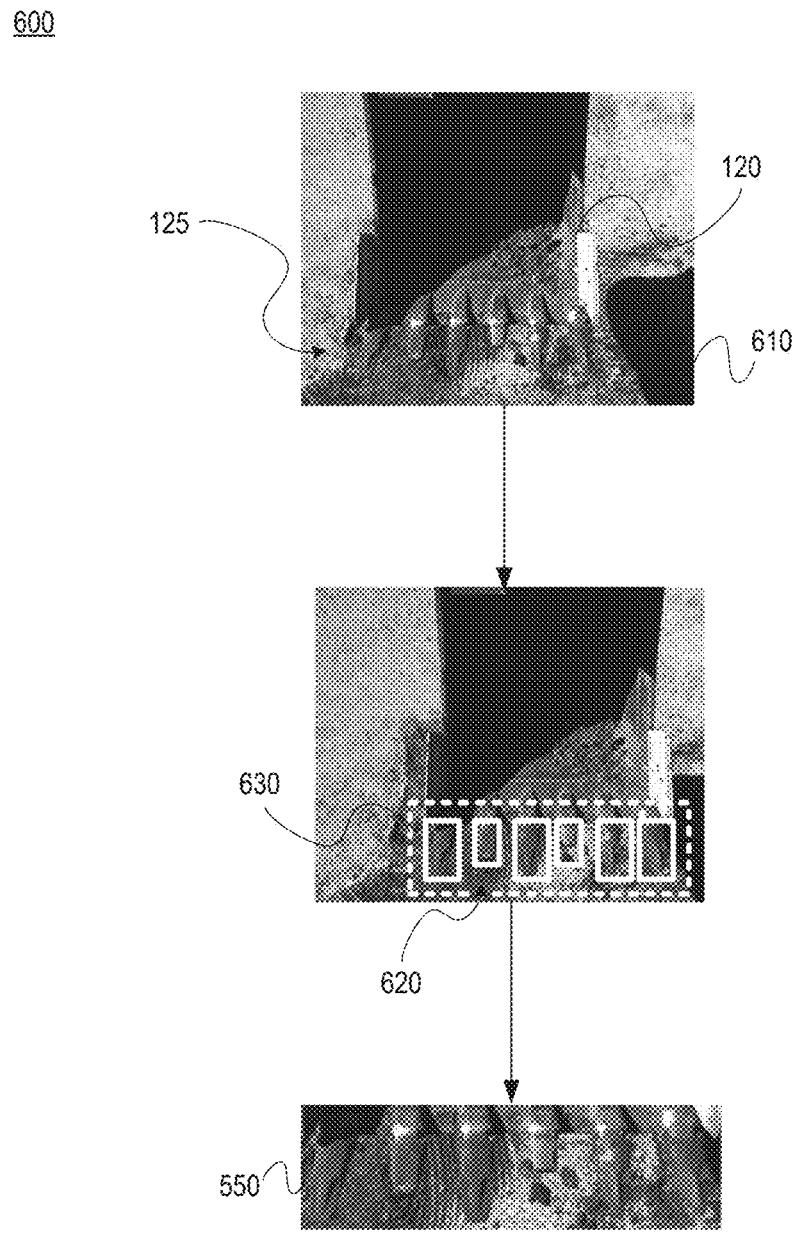
FIG. 6 is an image data flow diagram depicting an example flow of image data for a region of interest detection process using deep learning techniques.

FIG. 6 depicts an image data flow diagram 600 depicting an example flow of imaging data for a region of interest detection process using deep learning techniques. Similar to image data flow diagram 500 described above, the output of the region of interest detection process will be a region of interest 550 corresponding to GET 125 that image analyzer 150 will then use to further analyze the image data. But unlike image data flow diagram 500, image analyzer 150 utilizes deep learning techniques to detect region of interest 550 in image data flow diagram 600.

Image data flow diagram 600 includes image 610 captured by camera 128. Image 610 could be a rectified image captured by either the left image sensor or the right image sensor of camera 128, or it could be image data captured from sensor 126. Image analyzer 150 may apply a deep learning GET detection algorithm to image 610. The deep learning GET detection algorithm may employ a neural network that has been trained with a corpus of image data where GET have been individually identified and labeled and/or groups of GET have been individually identified and labeled. When image analyzer 150 applies the deep learning GET detection algorithm to image 610, it may identify a plurality of individual GET bounding boxes 620 containing images of individual GET 125. In some embodiments, image analyzer 150 may also identify a GET group bounding box 630 encompassing individual GET bounding boxes 620. Once image analyzer 150 identifies GET group bounding box 630 it may extract the pixels within it as region of interest 550. It is noted that while FIG. 6 shows detection of region of interest 550 from image 610, which may represent image data from the left image sensor of camera 128, the right image sensor of camera 128, the color image sensor of camera 128, or image data captured by sensor 126, in some embodiments, the image data flow diagram 600 may apply to more than one of these for a particular time instance. For example, image analyzer 150 may detect a region of interest in imaging data from more than one of the left image sensor of camera 128, the right image sensor of camera 128, the color image sensor of camera 128, and/or image data captured by sensor 126 at a particular time.

Figure 7:
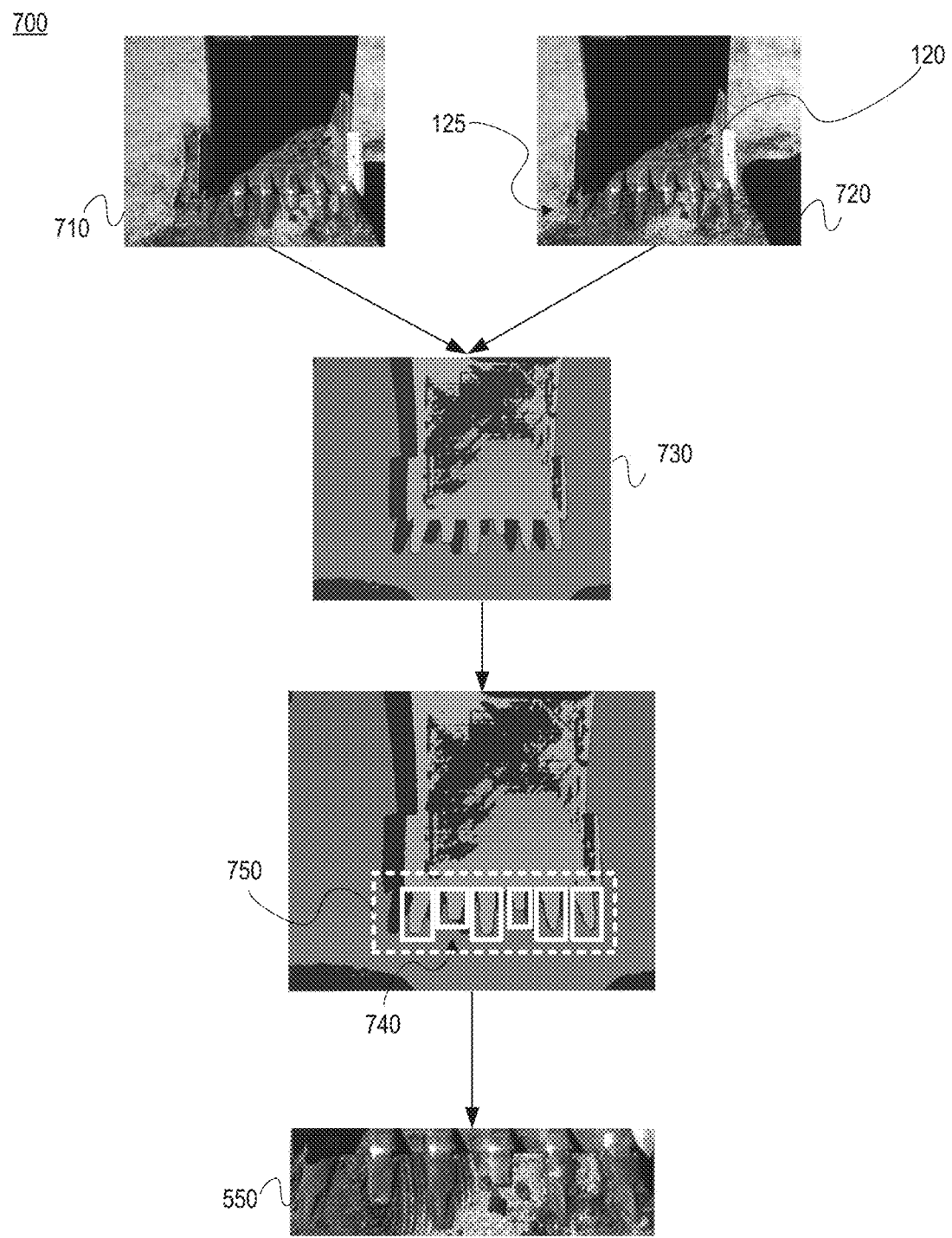
FIG. 7 is an image data flow diagram depicting an example flow of image data for a region of interest detection process using deep learning techniques.

FIG. 7 depicts an image data flow diagram 700 depicting an example flow of imaging data for a region of interest detection process using deep learning techniques. Similar to image data flow diagram 600 described above, the output of the region of interest detection process will be a region of interest 550 corresponding to GET 125 that image analyzer 150 will then use to further analyze image data. But unlike image data flow diagram 500, the deep learning GET detection algorithm described with respect to FIG. 7 has been trained using a corpus of data including disparity maps and regions of interest are detected using a disparity map generated from more than one image sensor (e.g., the left image sensor and right image sensor of camera 128).

Image data flow diagram 700 includes a first image 710 and a second image 720 captured by camera 128 or sensor 126. As one just example, first image 710 can be a rectified image captured by the left image sensor of camera 128 and second image 720 can be rectified image captured by the right image sensor of camera 128, but first image 710 and second image 720 need not necessarily be received from camera 128. As another example, one of first image 710 or second image 720 could be an infrared image data captured from sensor 126. As yet another example, first image 710 could be captured by sensor 126 while second image 720 could be captured by camera 128, or vice versa. Both first image 710 and second image 720 include images of bucket 120 and GET 125. Image analyzer 150 may process first image 710 and second image 720 to create disparity map 730. Disparity map 730 can be a dense stereo disparity map showing the disparity between each pixel of first image 710 and each pixel of second image 720.

Image analyzer 150 may apply a deep learning GET detection algorithm to disparity map 730. The deep learning GET detection algorithm may employ a neural network that has been trained with a corpus of image data where GET have been individually identified and labeled and/or groups of GET have been individually identified and labeled within disparity maps corresponding to the type of bucket 120 and GET 125 captured within first image 710 and second image 720. When image analyzer 150 applies the deep learning GET detection algorithm to disparity map 730, it may identify a plurality of individual GET bounding boxes 740 containing images of individual GET 125. In some embodiments, image analyzer 150 may also identify a GET group bounding box 750 encompassing individual GET bounding boxes 740. Once image analyzer 150 identifies GET group bounding box 750 it may extract the pixels within it as region of interest 550.

Figure 8:
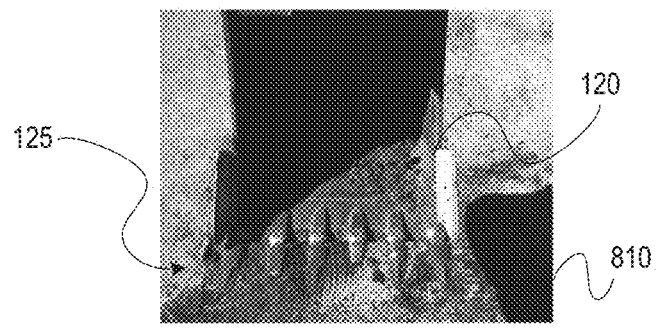
FIG. 8 is an image data flow diagram depicting an example flow of image data for a region of interest detection process using a LiDAR sensor and imaging data.
Figure 8:
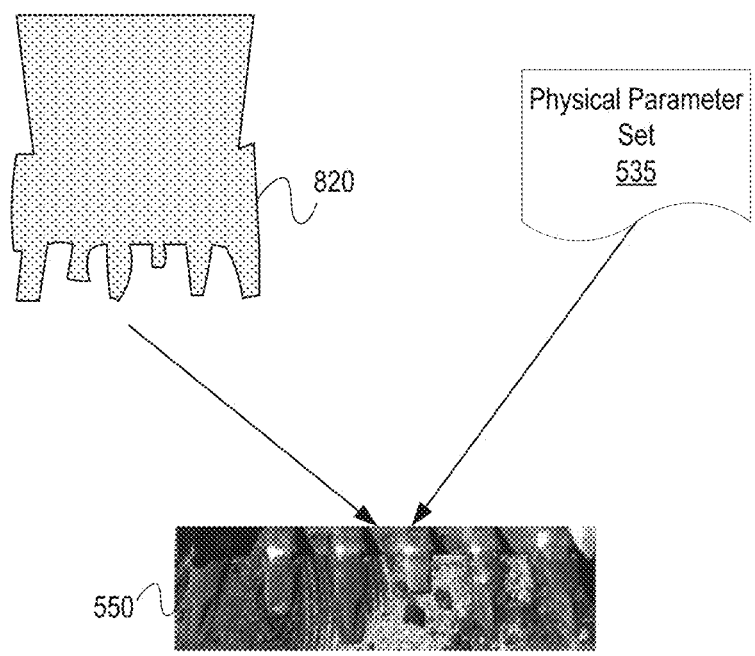

FIG. 8 depicts an image data flow diagram 800 depicting an example flow of imaging data for a region of interest detection process for imaging data captured by sensor 126. The description of FIG. 8 that follows uses a LiDAR embodiment of sensor 126 as an example, but other examples are contemplated. The imaging data captured by sensor 126 according to image data flow diagram 800 substantially corresponds to the field of view shown in image 810. As shown, the field of view includes bucket 120 and GET 125.

Sensor 126 performs a LiDAR data capture that includes a plurality of LiDAR "hits" for when sensor 126 detects an object surface, e.g., a surface corresponding to either bucket 120 or GET 125. The LiDAR hits can be represented as three-dimensional point cloud 820, where each point of three-dimensional point cloud 820 corresponds to a LiDAR hit. Image analyzer 150 determines region of interest of 510 based on three-dimensional point cloud 820 by performing a segmentation analysis or other object recognition analysis technique. In some embodiments, image analyzer 150 may use physical parameter set 535 to identify region of interest 550. For example, image analyzer 150 may use a bucket-tooth template, CAD-based model of GET 125, or pattern matching techniques to identify region of interest 550 within three-dimensional point cloud 820.

Figure 9:
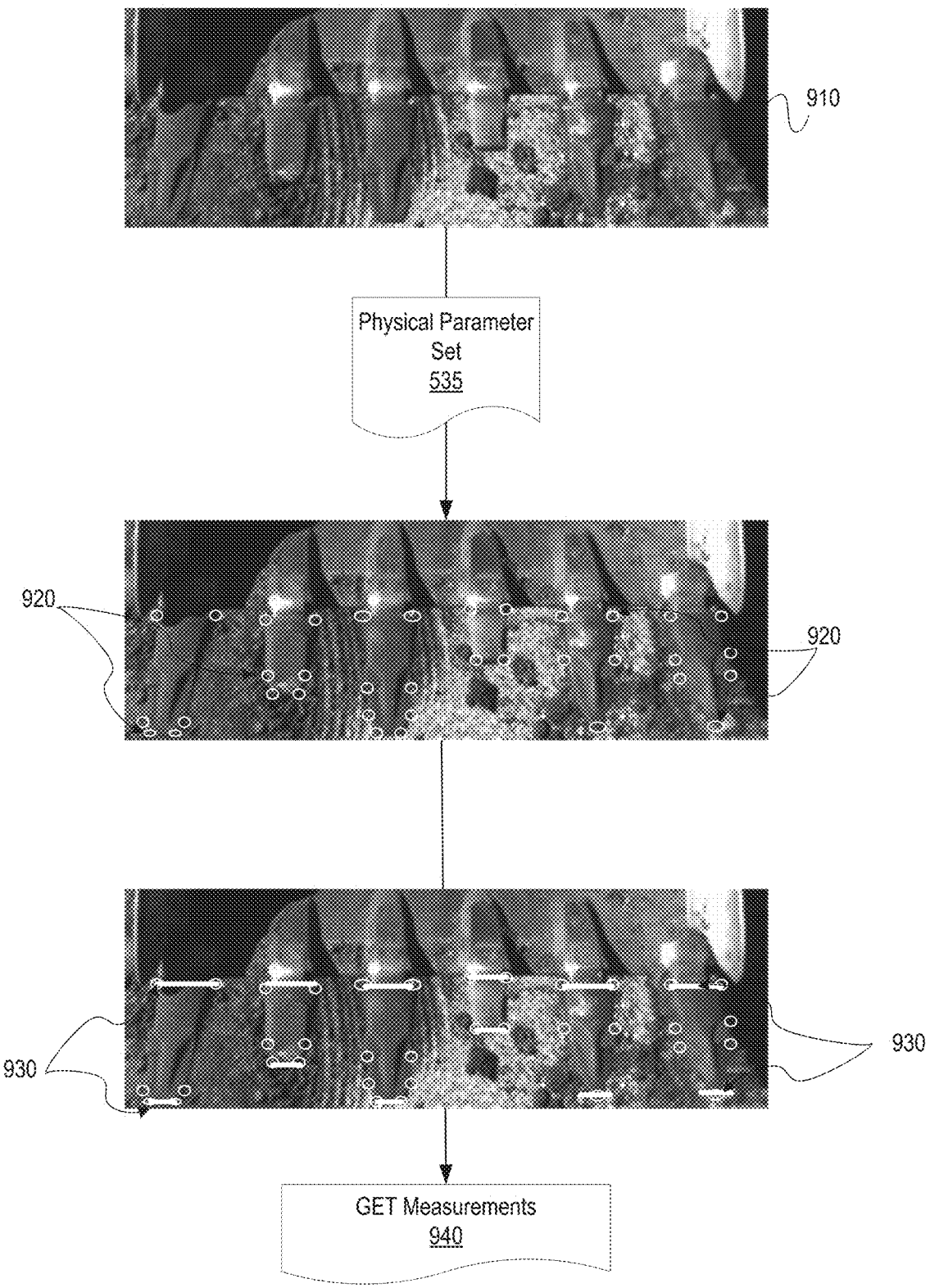
FIG. 9 is an image data flow diagram depicting an example flow of image data for a wear detection process using image points.

FIG. 9 depicts an image data flow diagram 900 depicting an example flow of imaging data for a wear detection process using marker point identification. As noted above, features of GET 125 can be considered marker points, and wear detection computer system 110 may determine GET 125 measurements based on identification of marker points within image data, or regions of interest in the image data corresponding to GET 125. Marker points can include, for example, edges, corners or specific angles of GET 125. Data flow diagram 900 shows the flow of data for marker point identification using one region of interest (e.g., region of interest 910), but in operation, wear detection computer system 110 may process imaging data according to data flow diagram 900 for multiple sets of image data received from sensor 126 and/or camera 128 per time instance.

Once image analyzer 150 identifies region of interest 910, it references physical parameter set 535 to assist in identifying marker points 920 within region of interest 910 that correspond to GET 125. For example, physical parameter set 535 may include the size or shape of angles of each corner of GET 125 which image analyzer may use when performing corner detection analysis on region of interest 910. As another example, physical parameter set 535 may include a template that matches marker points in GET 125 (e.g., an image of a corner, mark, weld, or other identifier) that image analyzer 150 applies in a segmentation analysis to region of interest 910. In embodiments where region of interest 910 corresponds to image data captured by an IR camera, physical parameter set 535 may include temperature information related to expected temperature values of GET 125 and the work environment in which GET 125 are used.

Once image analyzer 150 determines marker points 920, it can identify and/or otherwise determine GET ends 930. GET ends 930 correlate to the length of GET 125, with one end correlating to the bucket-side edge of GET 125 (e.g., where GET 125 meets bucket 120) and another end correlating to the front or engaging edge of GET 125 (e.g., where GET 125 engages with ground). Based on the determination of GET ends 930, wear analyzer 153 can determine GET measurements 940 for GET 125 that are within region of interest 910. For example, wear analyzer 153 may determine the number of pixels between GET ends 930 for a particular GET 125, then convert the pixel count to a distance measurement (e.g., a real-world distance measurement in metric or imperial units).

Figure 10:
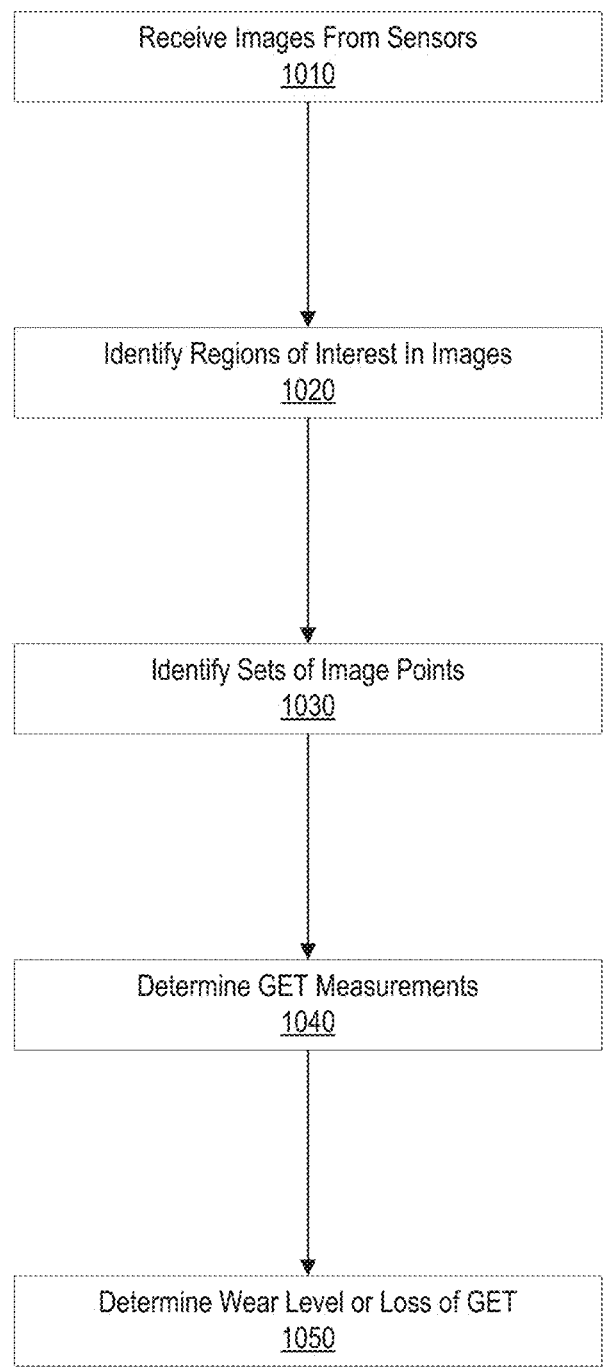
FIG. 10 is an example process for detecting wear in an example environment.

FIG. 10 shows a flowchart representing an example wear detection process 1000 to detect wear of GET 125. In some embodiments, process 1000 can be performed by image analyzer 150 and wear analyzer 153. Process 1000 generally follows the image data flows of FIGS. 5-9 and should be interpreted consistent with the description of these figures, and the descriptions of image analyzer 150 and wear analyzer 153 described above with respect to FIG. 1. Although the following discussion describes aspects of process 1000 being performed by image analyzer 150 or wear analyzer 153, other components of wear detection computer system 110 may perform one or more blocks of process 1000 without departing from the spirit and scope of the present disclosure.

Process 1000 begins at step 1010 where image analyzer 150 receives imaging data from a plurality of sensors associated with work machine 100. The plurality of sensors can include sensor 126 and the left monochrome, right monochrome, or color image sensors of camera 128, for example. In some embodiments, each of the plurality of sensors have different fields of view. For example, the left monochrome image sensor of camera 128 and the right monochrome image sensor of camera 128 may have slightly different fields of view to create the parallax needed for a stereo imaging. As another example, sensor 126 and camera 128 may have differing orientations on work machine 100 to capture image data related GET 125 from different angles. Image analyzer 150 receives imaging data from each of the plurality of sensors during a dig-dump cycle of the work machine, and image analyzer 150 may correlate the respective imaging data for the plurality of sensors for analysis purposes. For example, for one iteration of process 1000, image analyzer 150 may receive first image data from one of the plurality of sensors, and second image data from another of the plurality of sensors, and process them together to determine a GET wear measurement for one dig-dump cycle.

At step 1020, image analyzer 150 identifies respective regions of interest within the image data it received from the plurality of sensors at step 1010. For example, image analyzer 150 may use computer vision techniques (see e.g., FIG. 5) to identify a first region of interest within first image data received from a first of the plurality of sensors and a second region of interest within second image data received from a second of the plurality of sensors. Image analyzer 150 may also use deep learning techniques (see e.g., FIGS. 6, 7) to identify a first region of interest within first image data received from a first of the plurality of sensors and a second region of interest within second image data received from a second of the plurality of sensors. When one of the plurality of sensors is a LiDAR sensor, image analyzer 150 may use a point cloud analysis method to determine a region of interest within image data (see e.g., FIG. 8).

At step 1030, image analyzer 150 may also identify one or more image points within the regions of interest (see e.g., FIG. 9). In some examples, the image points identified by image analyzer 150 at step 1030 are associated with edges of GET 125 as described above with respect to FIGS. 1 and 9. In some embodiments, image analyzer 150 uses geometric parameters describing GET 125 to determine the image points. The geometric parameters may describe the corners of GET 125 (e.g., relative length of front edges to side edges, corner angles, corner shapes) or they may describe other physical aspects of GET 125 such as overall size, shape, or thickness.

At step 1040, wear analyzer 153 determines GET measurements based on the image points identified at step 1030. Wear analyzer 153 may correlate pixel counts between image points to distance measurements (see e.g., FIG. 9) to determine GET measurements. In some embodiments, wear analyzer 153 may track and record GET measurements in pixels. Based on GET measurements determined at step 1040, wear analyzer 153 determines wear level or loss of GET at step 1050. The wear level or loss may be quantified in real-world measurements (e.g., millimeters), in terms of pixels, or as a percentage of expected size (based, for example, on the CAD-based model for GET 125). As discussed above, wear analyzer 153 may use a CAD-based model of GET 125 in an unworn state and compare it to the observed GET 125 measurement to determine GET wear level or loss. Wear analyzer 153 can also use historical measurement data for GET to determine wear level over time or to determine a wear level trend to make a prediction of when GET 125 will need replacement. In some embodiments, wear analyzer 153 may be configured to determine loss when wear exceeds a threshold. For example, wear analyzer may determine loss of a GET if its size is more then 50% reduced, or reduced by a fixed measurement amount (e.g., 5 cm in length). Wear analyzer 153 may generate an alert when wear of GET meets or exceeds the threshold.

In some embodiments, image analyzer 150 and wear analyzer 153 perform process 1000 several times within one dig-dump cycle. In such embodiments, wear analyzer 153 may compare GET measurements determined (step 1040) at the current point in the dig-dump cycle to one or more GET measurements determined earlier (or later) within the same dig-dump cylce, or to historical measurements and determine whether the currently determined GET measurement is consistent. If the measurement is inconsistent—e.g., it differs from other GET measurements within the same dig-dump cycle by some threshold value—wear analyzer 153 can discard the current measurement as noise or erroneous data. The threshold value can be configured based on the environment, work machine, or type of GET. For example, for a work machine digging softer materials with long GET, the threshold may be set to a low value (e.g., less than 10%) and for a work machine digging hard materials with shorter GET, the threshold may be set to a higher value (e.g., greater than 20%). In addition, in some embodiments, image analyzer 150 and wear analyzer 153 may also consider the point in time within the dig-dump cycle in when it performs process 1000 to determine whether a determined GET measurement is noise.

Figure 11:
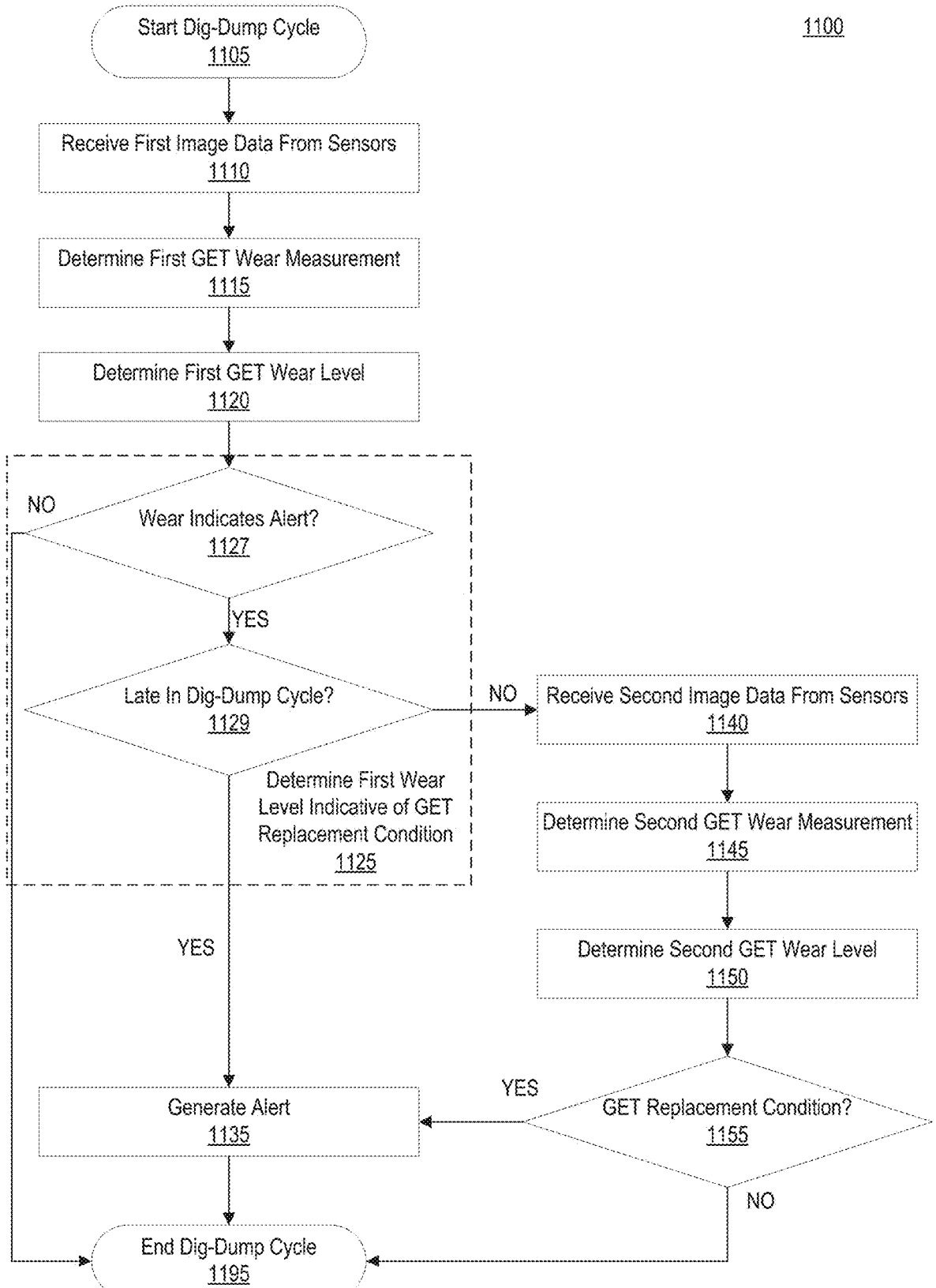
FIG. 11 is an example process for detecting wear in an example environment.

FIG. 11 shows a flowchart representing an example wear detection process 1100 to detect wear of GET 125. In some embodiments, process 1100 can be performed by image analyzer 150 and wear analyzer 153. Process 1100 generally follows the image data flows of FIGS. 5-9 and should be interpreted consistent with the description of these figures, the descriptions of image analyzer 150 and wear analyzer 153 described above with respect to FIG. 1, and wear detection process 1000. Although the following discussion describes aspects of process 1100 being performed by image analyzer 150 or wear analyzer 153, other components of wear detection computer system 110 may perform one or more blocks of process 1100 without departing from the spirit and scope of the present disclosure.

Process 1100 can be performed within one dig-dump cycle of work machine 100 or within/across multiple dig-dump cycles of work machine 100. In some embodiments, image analyzer 150 and wear analyzer 153 perform process 1100 several times within a single dig-dump cycle.

After the start of the dig-dump cycle (block 1105), at step 1110 image analyzer 150 receives first image data from sensor 126 or camera 128. After processing the image first image data (using the process 1000 as just one non-limiting example), wear analyzer 153 determines a first wear measurement for GET 125 at block 1115 and from that determines a first wear level for GET 125. Wear analyzer 153 may determine the first wear measurement and first wear level using techniques described above with respect to FIGS. 1, 9 and 10 as just some examples.

After wear analyzer 153 determines the first wear level for GET 125, it will determine whether the first wear level is indicative of a GET replacement condition, e.g., if wear analyzer 153 should generate an alert to notify the operator of work machine 100 that a GET needs replacement. The determination of whether the first wear level is indicative of a GET replacement condition can contain two decisions in some embodiments. One decision is whether the wear level indicates the need for alert (step 1127). If the wear level does not indicate the need for an alert (step 1127: NO), process 1100 ends and may be repeated at another time within the same dig-dump cycle consistent with disclosed embodiments. (block 1195). If, however, the wear level indicates the need for an alert (step 1127: YES), processing moves to the other decision (step 1129)—whether the first image data was captured late in the dig-dump cycle. In some embodiments, the other decision may be based on a "late point" within the dig-dump cycle. If the first image data is received after the late point, then wear analyzer 153 may determine that it is late in the dig-dump cycle (step 1129: YES), process 1100 will proceed to step 1135 and wear analyzer 153 will generate an alert. If the first image data is received before the late point, then wear analyzer 153 may determine that it is not late in the dig-dump cycle (step 1129: NO), and process 1100 will proceed to step 1140. The late point can be set by the operator of work machine 100 in some embodiments and the late point may have a default setting. An example default setting is the mid-point or 50% point in the dig-dump cycle—image data captured closer to the end of the dig-dump cycle is captured late in the cycle whereas image data captured closer to the beginning of the dig-dump cycle is captured early (not late) in the dig-dump cycle.

When wear analyzer 153 determines that the first GET wear level indicates the need for an alert and it did not receive the first image data late in the dig-dump cycle, a second set of image data for GET 125 will be collected to confirm the need for an alert. At step 1140, image analyzer 150 receives second image data from sensor 126 or camera 128. After processing the second image data (using the process 1000 as just one non-limiting example), wear analyzer 153 determines a second wear measurement for GET 125 at block 1145 and from that determines a second wear level for GET 125 (step 1150) in way similar to how it determined the first wear level for GET 125, described above. Wear analyzer 153 then determines whether the GET replacement condition has been satisfied. If both the first wear level and the second wear level indicate the need for an alert (step 1155: YES), then wear analyzer will generate an alert at step 1135. If, however, the second wear level does not indicate the need for an alert (step 1155: NO), the GET replacement condition is not satisfied and process 1100 ends for the current dig-dump cycle (block 1195).

In some embodiments, wear analyzer 153 may log the first GET wear level or second GET wear level (when calculated) for each iteration of process 1100. Logging may include storing a the GET wear measurement, GET wear level, and/or storing captured image data. Wear analyzer 153 may log this information local to wear detection computer system 110 in GET wear level storage 157, or provide it to remote monitoring computer system for storage in remote log manager 175.

Figure 12:
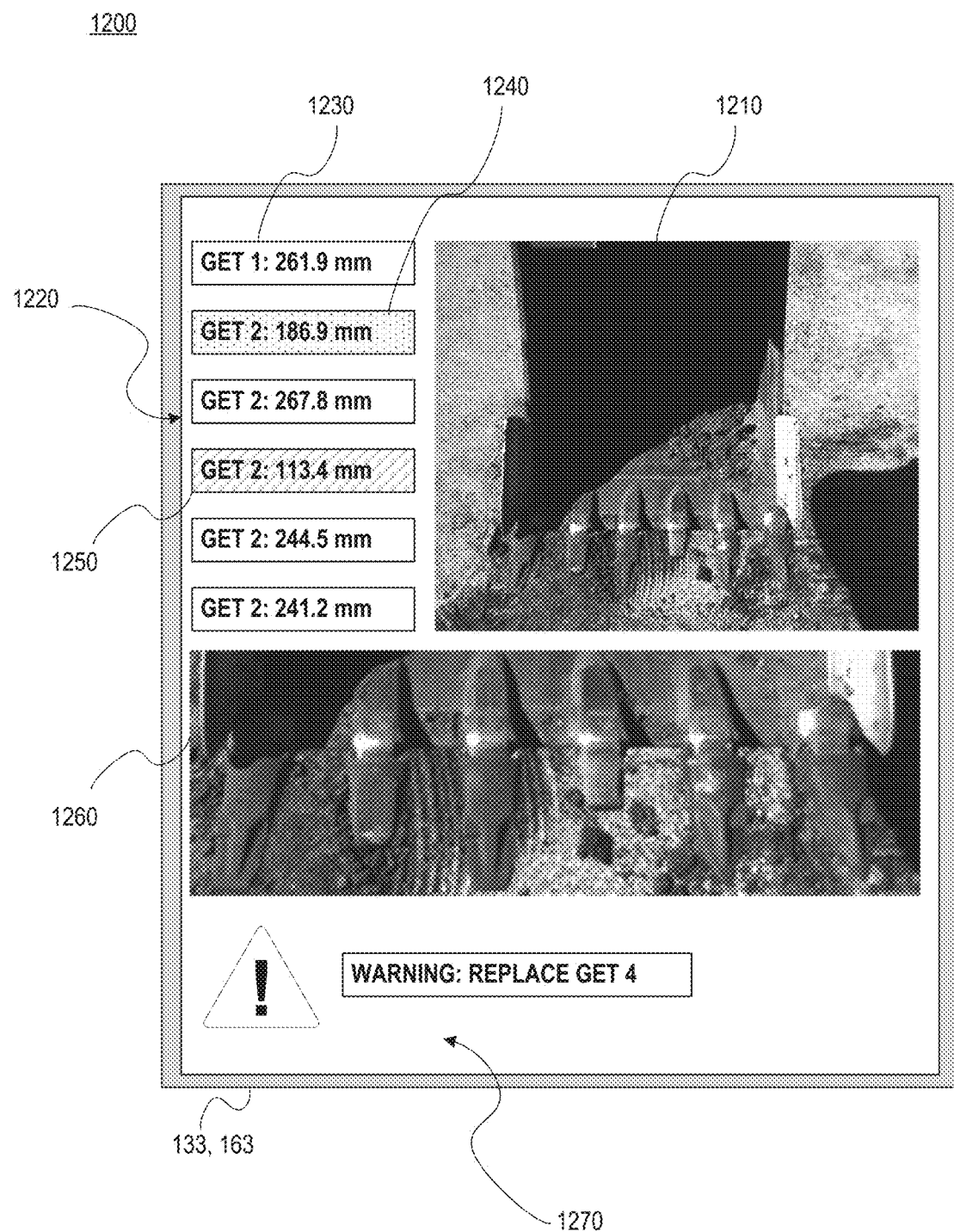
FIG. 12 is an example user interface of an example system for detecting wear in GET.

FIG. 12 shows an example wear detection user interface 1200 that can be rendered on display 133 or remote display 163. User interface 1200 can include a captured image 1210 of bucket 120 and GET 125. Captured image 1210 can be a still image or real-time video image of bucket 120 and GET 125 in some embodiments. User interface 1200 can also include status user interface elements 1220 for GET 125 that display the current status of GET 125. Status user interface elements 1220 can display, for example, the current measurement of GET 125 (as shown in FIG. 12), percentage wear of GET 125, or both. In some embodiments, status user interfaces may include indicia of GET wear such as color coding to provide information to the operator of work machine 100. For example, when GET 125 are in good health without significant wear, status user interface elements 1220 may render with a healthy indicator 1230. Healthy indicator 1230 can be color coded (e.g., green) to indicate no action need be taken. As another example, when GET 125 are partially worn and close to needing replacement, status user interface elements 1220 may render with a partial wear indicator 1240. Partial wear indicator 1240 can be color coded (e.g., yellow), in special font, or appear highlighted within user interface 1200. As another example, when GET 125 are worn to the point of needing replacement, or have broken, status user interface elements 1220 may render with a complete wear indicator 1250. Complete wear indicator 1250 can be color coded (e.g., red), in special font, appear highlighted or consistently flash within user interface 1200 to alert the operator.

User interface 1200 can also include a close-up view 1260 of GET 125. Close-up view 1260 may correspond, for example, to identified regions of interest within image data. In some embodiments, in addition to complete wear indicator 1250, user interface 1200 can include warning notification 1270 to alert the operator of a GET replacement condition. Audio cues or alarms may also accompany partial wear indicator 1240, complete wear indicator 1250, and/or warning notification 1270.

Throughout the above description, certain components of wear detection computer system 110 were described to perform certain operations. But, in some embodiments of wear detection computer system 110, other components may perform these operations other than what is described above. In addition, wear detection computer system 110 may include additional or fewer components than what is presented above in example embodiments. Those of skill in the art will appreciate that wear detection computer system 110 need not be limited to the specific embodiments disclosed above.

INDUSTRIAL APPLICABILITY

The systems and methods of this disclosure can be used in association with operation of work machines at a worksite that are excavating, moving, shaping, contouring, and/or removing material such as soil, rock, minerals, or the like. These work machines can be equipped with a bucket used to scoop, dig, or dump the material while at the worksite. The bucket can be equipped with one or more GET to assist with the loosening of the material during operation. The work machines can also include a system having a processor and memory configured to perform methods of wear detection according to the examples described herein. The systems and methods can detect wear or loss of work machine components such as GET so operators of such work machines can take corrective action before a failure damaging downstream processing equipment can occur.

In some examples, the systems and methods capture imaging data associated with GET from one or more sensors of the work machine that is then processed to determine wear or loss of the GET. The one or more sensors can include LiDAR sensors, image sensors, and/or stereoscopic cameras.

In some examples, the systems and methods use image data from a plurality of sensors to more accurately determine GET wear. The systems and methods detect image points within the image data to correlate GET measurements across the plurality of image sensors. By using image points, processing across differing types of sensors can be simplified with accuracy. Moreover, using image points can reduce computational complexity of GET wear measurement by reducing the amount of data need to determine a measurement. The process described in the present disclosure provides high-precision measurements of GET while still providing processing efficiency.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A computer-implemented method, comprising:
   receiving a first plurality of images from a plurality of sensors associated with a work machine, the first plurality of images comprising images of at least one ground engaging tool (GET) of the work machine captured by the plurality of sensors at a first resolution, wherein individual sensors of the plurality of sensors have respective fields-of-view different from other sensors of the plurality of sensors;
   identifying a first region of interest associated with the at least one GET and included in the first plurality of images, the first region of interest including first data characterizing the at least one GET;
   based on identifying the first region of interest, causing the plurality of sensors to capture a second plurality of images of the first region of interest at a second resolution higher than the first resolution;
   identifying a second region of interest associated with the at least one GET and included in a first image of the second plurality of images, the second region of interest including second data characterizing the at least one GET;
   identifying a third region of interest associated with the at least one GET and included in a second image of the second plurality of images, the third region of interest including third data characterizing the at least on GET;
   determining a first set of image points for the at least one GET, the first set of image points being determined based at least in part on geometric parameters associated with the at least one GET and first edges of the at least one GET detected in the second data;
   determining a second set of image points for the at least one GET, the second set of image points being determined based at least in part on the geometric parameters associated with the at least one GET and second edges of the at least one GET detected in the third data;
   determining a GET measurement for the at least one GET based at least in part on the first set of image points and the second set of image points; and
   determining a wear level or loss for the at least one GET based on the GET measurement.

2. The computer-implemented method of claim 1 wherein the plurality of sensors includes a left image sensor and a right image sensor of a stereoscopic camera; and the second plurality of images includes:
   a left image of the at least one GET captured by the left image sensor, and
   a right image of the at least one GET captured by the right image sensor.

3. The computer-implemented method of claim 2 wherein identifying the second region of interest includes generating a disparity map based on the left image and the right image.

4. The computer-implemented method of claim 1 wherein the plurality of sensors includes an infrared image sensor.

5. The computer-implemented method of claim 1 wherein identifying the second region of interest includes applying a deep learning GET detection algorithm to the first image or identifying the third region of interest includes applying a deep learning GET detection algorithm to the second image.

6. The computer-implemented method of claim 1 wherein determining the wear level or loss for the at least one GET is based at least in part on a CAD-based model for the at least one GET.

7. The computer-implemented method of claim 1 wherein determining the wear level or loss for the at least one GET is based at least in part on previously determined wear levels for the at least one GET.

8. The computer-implemented method of claim 1 wherein the first set of image points or the second set of image points correspond to at least one of a bucket-side edge of the at least one GET or a front edge of the at least one GET.

9. The computer-implemented method of claim 1 further comprising generating an alert when the wear level or loss is indicative of a GET replacement condition.

10. A system, comprising:
    a plurality of sensors associated with a work machine, wherein individual sensors of the plurality of sensors have respective fields-of-view different from other sensors of the plurality of sensors, the respective fields-of-view directed to capture images of at least one ground engaging tool (GET) of the work machine;
    one or more processors; and
    non-transitory computer readable media storing executable instructions that when executed by the one or more processors cause the one or more processors to perform operations comprising:
       causing the plurality of sensors to capture, at a first resolution, a first plurality of images of the at least one GET;
       identifying a first region of interest associated with the at least one GET and included in the first plurality of images, the first region of interest including first data characterizing the at least one GET;
       based on identifying the first region of interest, causing the plurality of sensors to capture a second plurality of images of the first region of interest at a second resolution higher than the first resolution;
       identifying a second region of interest associated with the at least one GET and included in a first image of the second plurality of images, the second region of interest including second data characterizing the at least one GET;
       identifying a third region of interest associated with the at least one GET and included in a second image of the second plurality of images, the third region of interest including third data characterizing the at least on GET;
       determining a first set of image points for the at least one GET, the first set of image points being determined based at least in part on geometric parameters associated with the at least one GET and first edges of the at least one GET detected in the second data;
       determining a second set of image points for the at least one GET, the second set of image points being determined based at least in part on the geometric parameters associated with the at least one GET and second edges of the at least one GET detected in the third data;
       determining a GET measurement for the at least one GET based at least in part on the first set of image points and the second set of image points; and
       determining a wear level or loss for the at least one GET based on the GET measurement.

11. The system of claim 10 wherein the plurality of sensors includes a left image sensor and a right image sensor of a stereoscopic camera; and
    the second plurality of images includes:
       a left image of the at least one GET captured by the left image sensor, and a right image of the at least one GET captured by the right image sensor.

12. The system of claim 11 wherein:
the plurality of sensors further includes an additional sensor different from the stereoscopic camera and operable to capture the first plurality of images;
identifying the second region of interest includes generating a dense stereo disparity map based on the left image and the right image; and
generating the dense stereo disparity map includes:
performing a comparison between image point data captured by the stereoscopic camera and the additional sensor, and
disregarding a portion of the image point data determined, based on the comparison, to be erroneous.

13. The system of claim 10 wherein:
the plurality of sensors includes an infrared image sensor and a stereoscopic camera,
the first plurality of images is received from the stereoscopic camera,
the second plurality of images is received from the infrared image sensor, and
determining the GET measurement includes fusing the first image data with the second image data and the third image data.

14. The system of claim 10 wherein identifying the second region of interest includes applying a deep learning GET detection algorithm to the first image or identifying the third region of interest includes applying a deep learning GET detection algorithm to the second image.

15. The system of claim 10 wherein determining the wear level or loss for the at least one GET is based at least in part on a CAD-based model for the at least one GET.

16. The system of claim 10 wherein determining the wear level or loss for the at least one GET is based at least in part on previously determined wear levels for the at least one GET.

17. The system of claim 10 wherein the first set of image points or the second set of image points correspond to at least one of a bucket-side edge of the at least one GET or a front edge of the at least one GET.

18. The system of claim 10 further comprising generating an alert when the wear level or loss is indicative of a GET replacement condition.

19. A work machine, comprising:
a bucket comprising at least one ground engaging tool (GET);
a stereoscopic camera comprising:
a left image sensor, and
a right image sensor;
an infrared sensor;
one or more processors; and
non-transitory computer readable media storing executable instructions that when executed by the one or more processors cause the one or more processors to perform operations comprising:
receiving images of the at least one GET captured by the stereoscopic camera at a first resolution;
identifying a first region of interest associated with the at least one GET and included in the images captured by the stereoscopic camera at the first resolution, the first region of interest including first data characterizing the at least one GET;
based on identifying the first region of interest, causing the left image sensor to capture a left image of the at least one GET, and including the first region of interest, at a second resolution higher than the first resolution;
based on identifying the first region of interest, causing the right image sensor to capture a right image of the at least one GET, and including the first region of interest, at the second resolution;
generating a disparity map based on the left image and the right image;
identifying a second region of interest associated with the at least one GET based on the disparity map, the second region of interest including second data characterizing the at least one GET;
receiving infrared image data from the infrared sensor;
identifying a third region of interest associated with the at least one GET within the infrared image data, the third region of interest including third data characterizing the at least one GET;
determining a first set of image points for the at least one GET, the first set of image points based at least in part on geometric parameters associated with the at least one GET and first edges of the at least one GET detected in the disparity map;
determining a second set of image points for the at least one GET, the second set of image points determined based at least in part on the geometric parameters associated with the at least one GET and second edges of the at least one GET detected in the third data;
determining a GET measurement for the at least one GET based at least in part on the first set of image points and the second set of image points; and
determining a wear level or loss for the at least one GET based on the GET measurement.

20. The work machine of claim 19 wherein identifying the second region of interest includes applying a deep learning GET detection algorithm to the disparity map.

* * * * *